United States Patent
Isobe et al.

(10) Patent No.: US 9,140,895 B2
(45) Date of Patent: Sep. 22, 2015

(54) IMAGING APPARATUS AND IMAGING METHOD FOR OBTAINING IMAGES FRO ELECTROMAGNETIC WAVES

(71) Applicant: Sony Corporation, Tokyo (JP)

(72) Inventors: Hiroshi Isobe, Kanagawa (JP); Hidetoshi Kabasawa, Saitama (JP); Masahiro Saito, Kanagawa (JP); Minoru Wakabayashi, Tokyo (JP); Hideo Niikura, Tokyo (JP); Satoshi Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 13/655,145

(22) Filed: Oct. 18, 2012

(65) Prior Publication Data

US 2013/0099097 A1 Apr. 25, 2013

(30) Foreign Application Priority Data

Oct. 25, 2011 (JP) .................................. 2011-233687

(51) Int. Cl.
*G02B 26/04* (2006.01)
*G01J 5/34* (2006.01)
*G01J 5/62* (2006.01)
*G01J 5/08* (2006.01)
*G01J 5/00* (2006.01)

(52) U.S. Cl.
CPC ............... *G02B 26/04* (2013.01); *G01J 5/0834* (2013.01); *G01J 5/34* (2013.01); *G01J 5/62* (2013.01); *G01J 2005/0077* (2013.01)

(58) Field of Classification Search
USPC ......... 396/452, 471, 479, 480, 481, 482, 483, 396/484–490, 502, 248, 261; 250/208.1, 250/208.2, 214.1, 214 R, 226
See application file for complete search history.

(56) References Cited

U.S. PATENT DOCUMENTS

| | | | | |
|---|---|---|---|---|
| 4,774,564 A * | 9/1988 | Konishi | ..................... | 348/224.1 |
| 6,813,046 B1 * | 11/2004 | Gindele et al. | ................ | 358/505 |
| 7,005,644 B2 | 2/2006 | Ishikawa et al. | | |
| 2001/0041843 A1 * | 11/2001 | Modell et al. | ................. | 600/473 |
| 2006/0127085 A1 * | 6/2006 | Matsuki et al. | ............... | 396/483 |
| 2010/0061715 A1 * | 3/2010 | Shintani | ........................ | 396/463 |
| 2011/0176799 A1 * | 7/2011 | Shintani | ....................... | 396/484 |
| 2012/0194718 A1 * | 8/2012 | Sato et al. | ..................... | 348/301 |

FOREIGN PATENT DOCUMENTS

JP 2004-317152 11/2004

* cited by examiner

*Primary Examiner* — Francis M Legasse, Jr.
(74) *Attorney, Agent, or Firm* — Sony Corporation

(57) ABSTRACT

Provided is an imaging apparatus including an imaging element section, an imaging optical system, a transmission/block section, an actuator, and an output section. The imaging element section includes a plurality of pixels, and the imaging optical system forms an image on the imaging element section, the image being formed by an electromagnetic wave from the outside. The transmission/block section transmits and blocks the electromagnetic wave to/against the imaging element section, the transmission/block section being disposed at an aperture stop position in the imaging optical system. The actuator drives the transmission/block section to move back and forth to be changed in state between transmission and blocking. The output section produces an image signal output being differential signaling between a pixel output from the imaging element section when the transmission/block section is in the transmission state, and a pixel output from the imaging element section when it is in the blocking state.

17 Claims, 16 Drawing Sheets

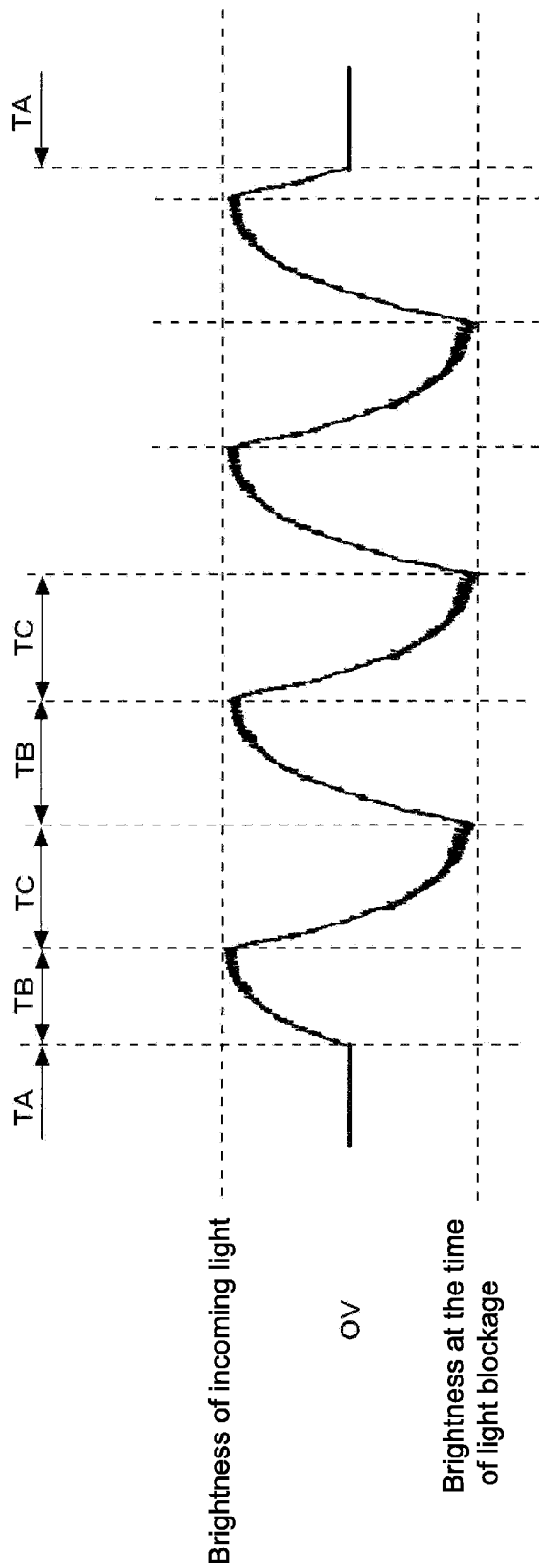

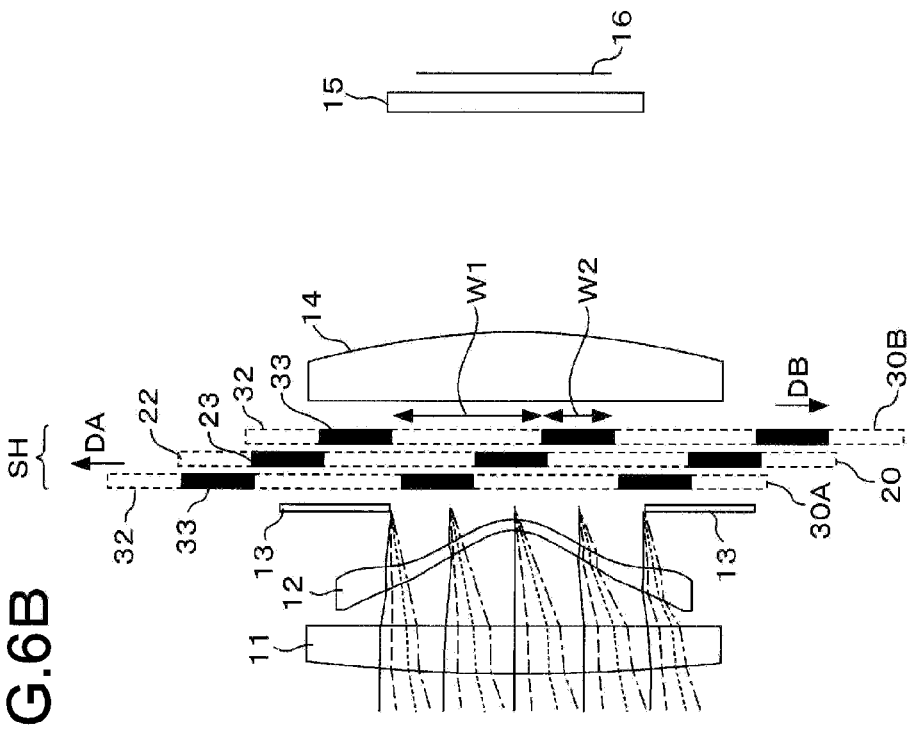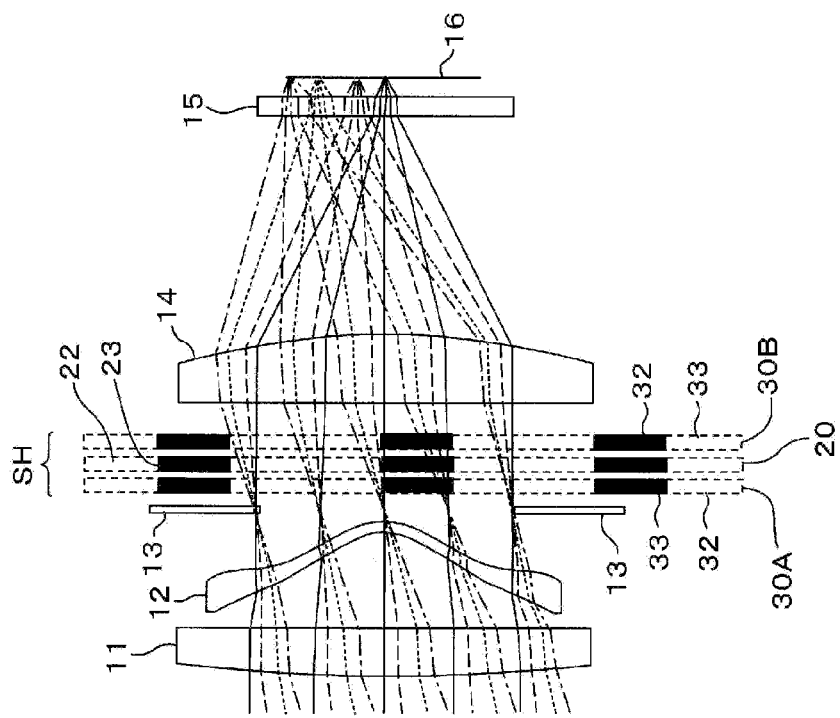

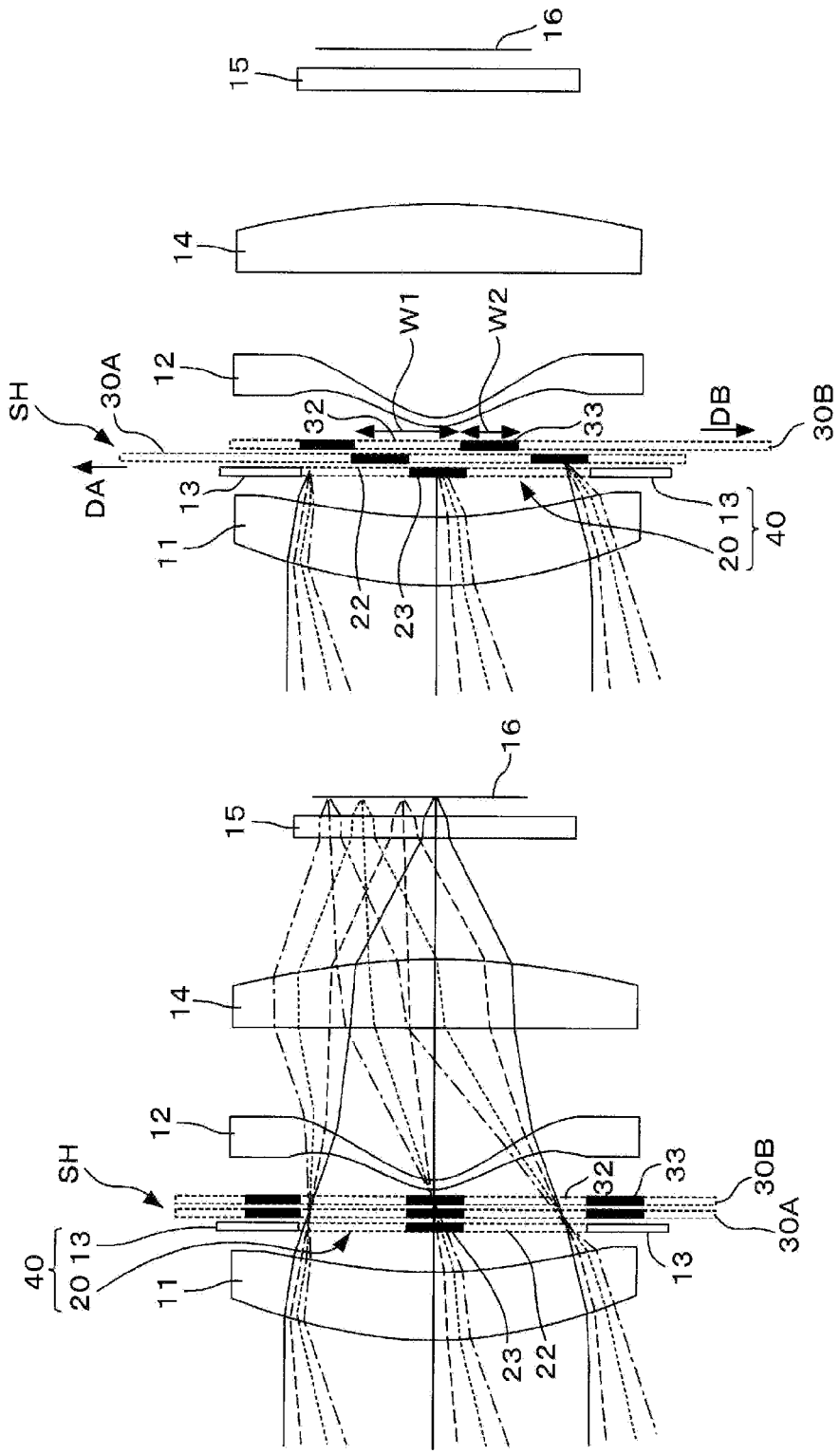

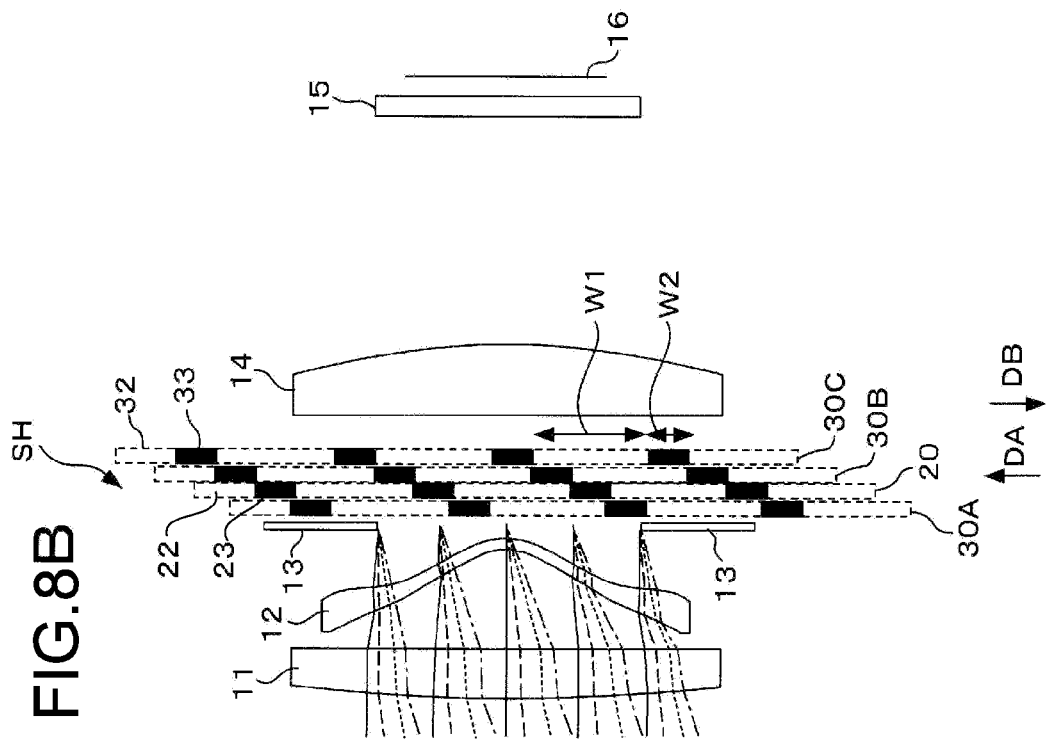
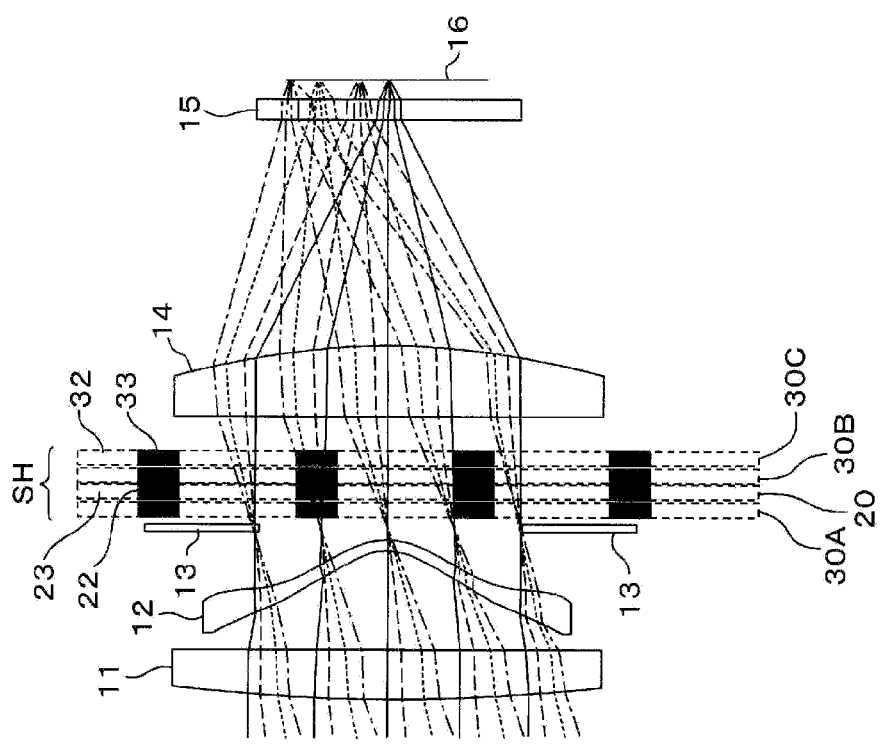

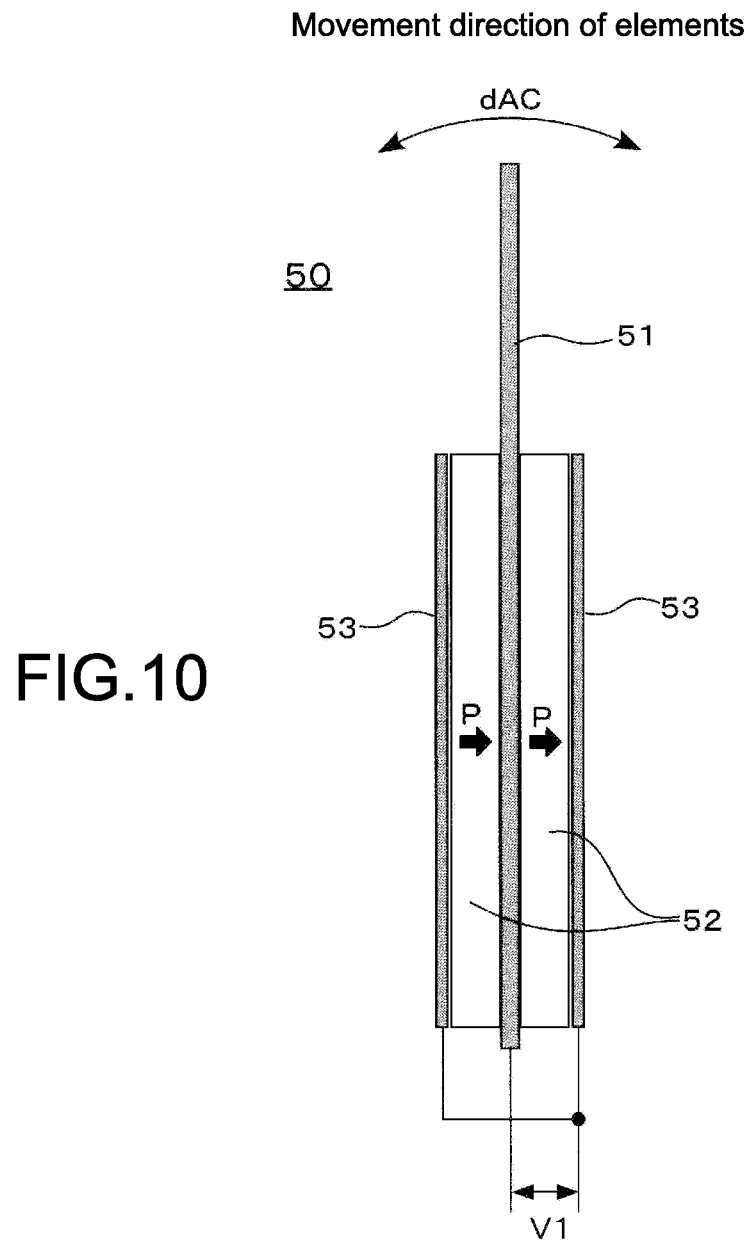

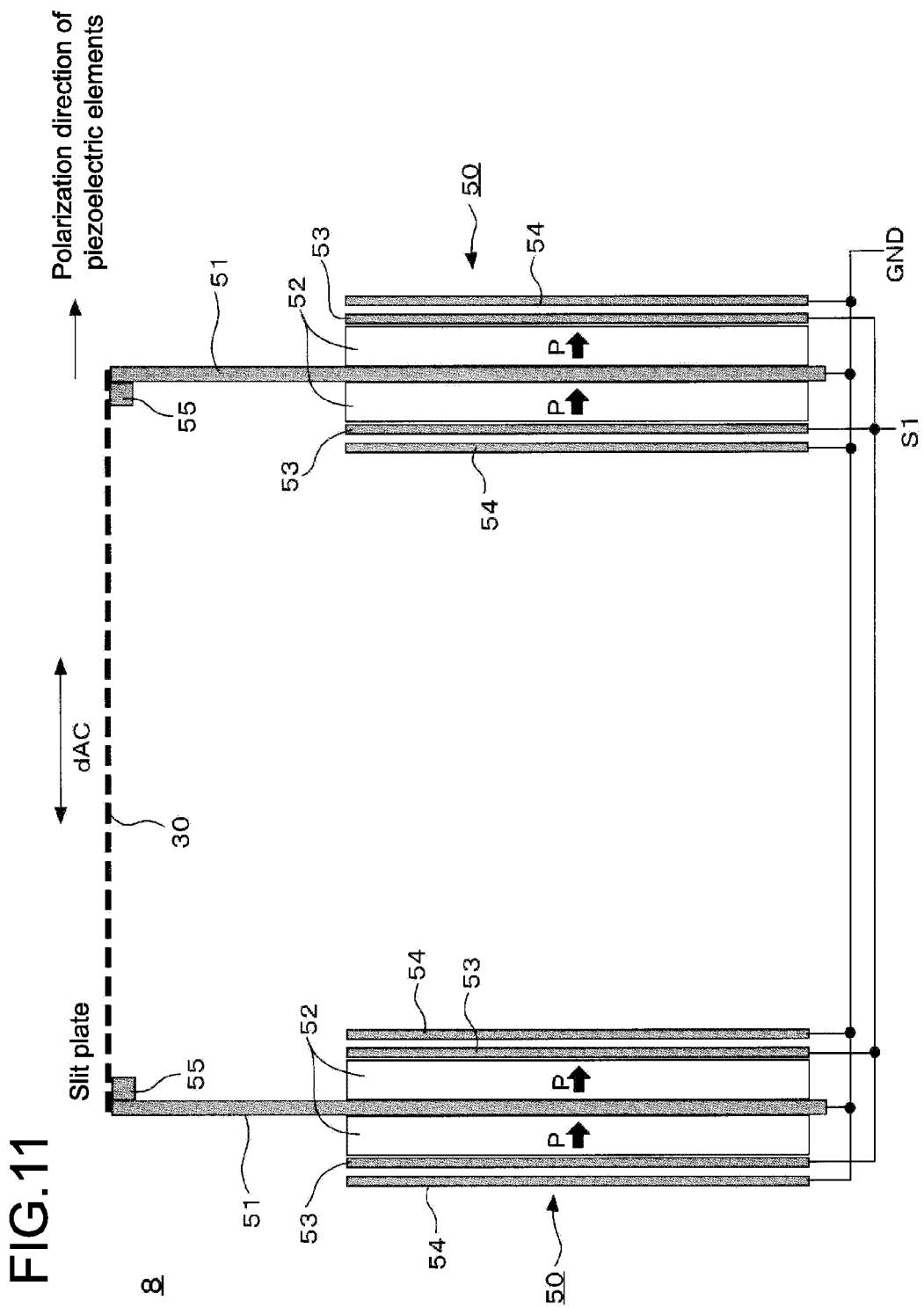

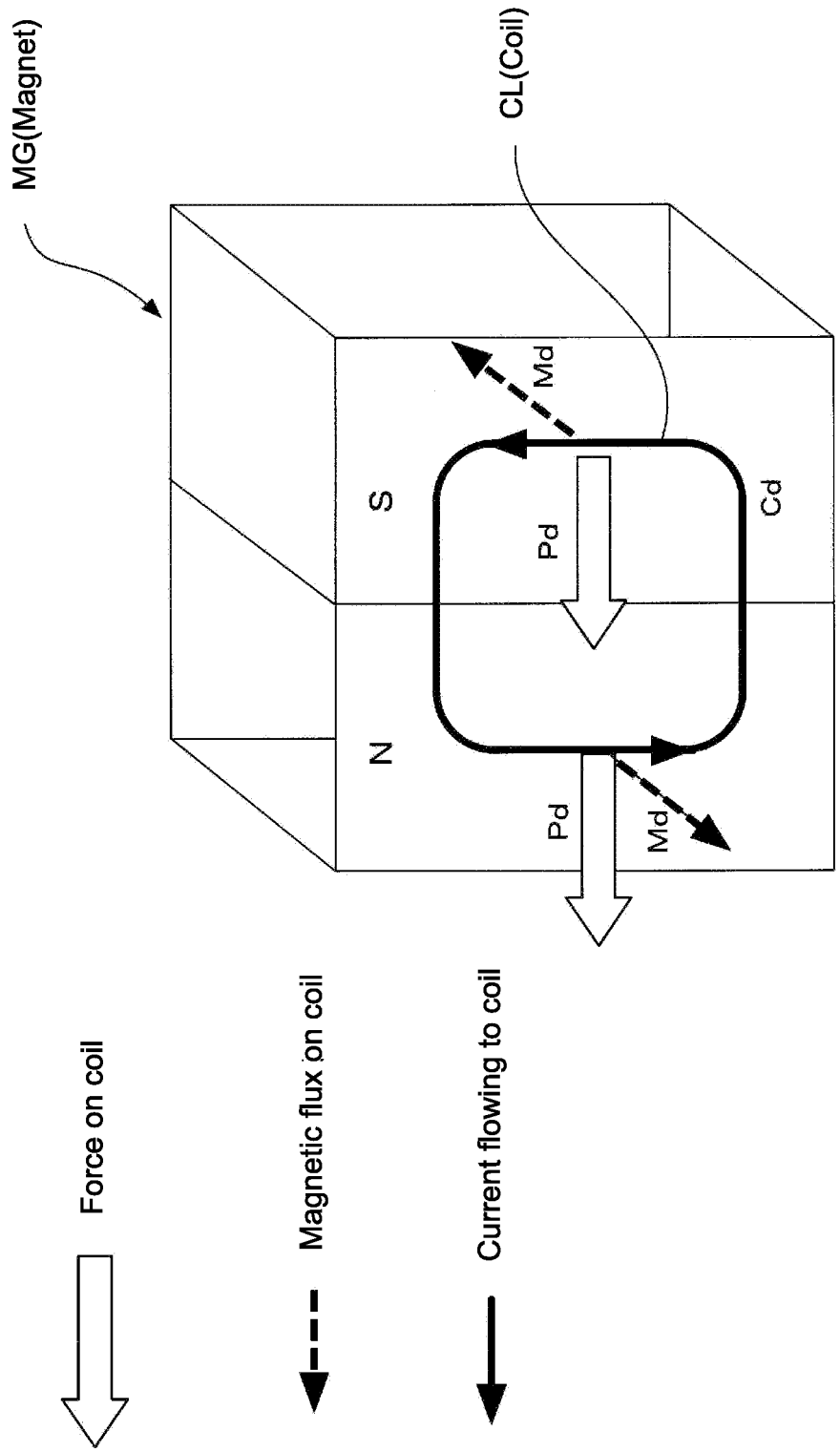

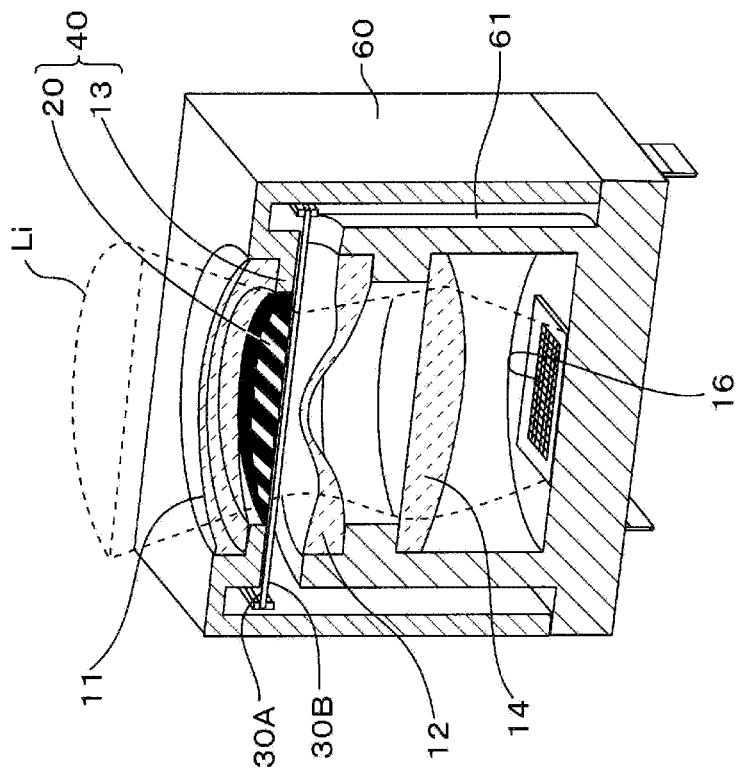
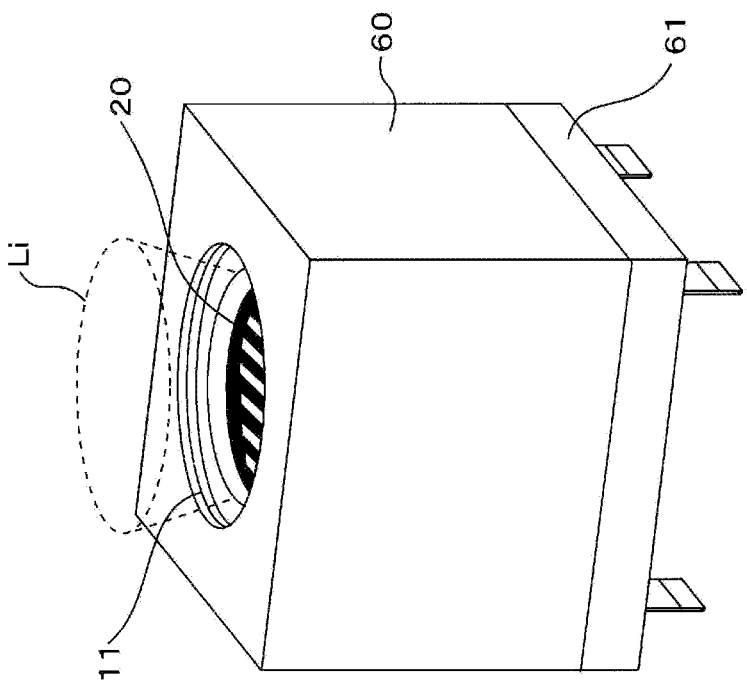
FIG.14A
FIG.14B

IMAGING APPARATUS AND IMAGING METHOD FOR OBTAINING IMAGES FRO ELECTROMAGNETIC WAVES

CROSS REFERENCES TO RELATED APPLICATIONS

The present application claims priority to Japanese Priority Patent Application JP 2011-233687 filed in the Japan Patent Office on Oct. 25, 2011, the entire content of which is hereby incorporated by reference.

BACKGROUND

The present disclosure relates to an imaging apparatus suitable for obtaining images from electromagnetic waves such as infrared rays.

SUMMARY

There has been proposed an infrared imaging apparatus, e.g., thermal imaging apparatus, which images a target object using infrared sensors each being an infrared detection pixel, and measures the temperature of the object. As an example, see Japanese Patent Application Laid-open No. 2004-317152.

This infrared imaging apparatus is configured by a lens and an imaging element, which are each a very expensive device. Especially the lens for use is expected to be a very expensive group of lenses made of Ge (germanium), ZnS (zinc sulfide), Si (silicon), or others with an excellent transmittance in the infrared wavelength region.

As an example, a piece of Ge lens costs 10,000 to 50,000 yen, and the lens is used in a set of two to five pieces. Therefore, only the lenses cost 20,000 to 250,000 yen in total although the price is depending on the expected resolution.

The current Ge lens uses germanium being a rare metal and hardly on the market, and thus the price of the material is very expensive like 50,000 to 180,000 yen/Kg.

As an alternative lens material, a possibility is ZnS (zinc sulfide) that is less expensive, for example. However, ZnS is indeed cheaper in price, but is poor in productivity in terms of processing. This results in a higher processing cost, and the resulting ZnS lens costs almost the same as a Ge lens.

As to an Si lens, the price is less expensive than a Ge lens, but is not suitable for use with thermography because of a reduced transmittance in the far infrared radiation area (8 to 14 μm).

As such, a lens not using a rare metal, being low in cost, and having a transmittance remaining the same even in the far infrared radiation area is not yet on the market. That is, as described above, an inexpensive lens is not yet proposed for use in an imaging apparatus using general terahertz waves, i.e., typically far infrared thermography.

In the infrared imaging apparatus, the imaging element in use is called microbolometer, and is in the hollow structure of supporting each VOx (vanadium oxide)-made pixel in the hollow space.

The reasons of the hollow structure are because the infrared sensors are each of a thermal type, and VOx has a low temperature coefficient resistance (TCR) α. This causes the reduction of a ratio with respect to the noise level (S/N ratio; Signal-to-Noise ratio) because the circuit system itself generates heat, for example. Therefore, for heat insulation, there is no alternative but the hollow structure.

As a result, the microbolometer has been the device being very poor in productivity, and being very expensive in price.

Moreover, for use with the pixels made of VOx, the microbolometer is expected to be manufactured by sputtering, vapor deposition, or others in a process different from the semiconductor process of manufacturing wiring patterns and circuits. This is because the etching process for the hollow structure does not work well with the semiconductor process, thereby also causing the price increase of the microbolometer.

Under the current circumstances, the infrared imaging apparatus in the high-cost structure as such is priced for about 600,000 yen if it is low in resolution, and for about 9,000,000 yen if it is high in resolution. Therefore, the infrared imaging apparatus currently available on the market is only for industrial use, and the market is not yet created for the infrared imaging apparatus for consumer use.

The imaging apparatus using terahertz waves not for far infrared thermography is under the circumstances similarly to the thermal imaging apparatus, and is sometimes more expensive than the thermal imaging apparatus.

The current far infrared thermography has a limited range of use, e.g., temperature management for industrial-use facilities, temperature detection of objects for security/safety measures, night vision system equipped in luxury vehicles for night-time human detection, and the body temperature detection for medical use. The number of units of the imaging apparatus shipped globally has remained at about 10,000 to 20,000 per year.

Moreover, the fact is that the imaging apparatus using terahertz waves is barely produced.

For implementing the infrared sensor at a lower cost than that in the previous imaging apparatuses, e.g., infrared imaging apparatus (thermal imaging apparatus), and the imaging apparatus using terahertz waves, the use of a pyroelectric element is a possibility, for example. The examples of using the pyroelectric element for far-infrared detection include automatic doors, air conditioners, and human detection sensors for human detection in front of television.

The issue here is that, in the previous infrared sensor using the pyroelectric element as such, the number of pyroelectric elements in use is one to four or so. The infrared sensor is thus a far cry from subject imaging, and is capable only of detecting if anyone cut across in front thereof.

This is because the output of the pyroelectric element shows a change depending on a change of temperature, and thus the pyroelectric element does not detect an object if the object is not moving.

Therefore, for imaging with an imager using the pyroelectric element, the use of an optical chopper is expected to provide a chopper function, i.e., periodically releasing and blocking the entire surface of the imager.

As exemplarily shown in FIG. 16, an optical chopper 101 is disposed as a light-shielding member in front of an imager (imaging element) 103 using a pyroelectric element. The optical chopper 101 is circular in shape, and is formed with apertures 102. The optical chopper 101 is rotated about the optical axis, i.e., the center line indicated by alternate long and short dashed lines, so that light L is allowed to reach the imager 103 or is blocked before reaching the imager 103. As such, with the incoming light L, a subject image can be obtained by the output from the pyroelectric element of the imager 103.

If this is the configuration, however, the optical chopper 101 itself is large in size as is evident from FIG. 16, and because the optical chopper 101 is to be rotated, a very large space is expected comparing to the area from which the light L comes for imaging.

It is thus desirable to provide an imaging apparatus whose configuration leads to further size reduction.

An imaging apparatus according to an embodiment of the present disclosure includes an imaging element section configured to include a plurality of pixels, an imaging optical system configured to form an image on the imaging element section, the image being formed by an electromagnetic wave from the outside, a transmission/block section configured to transmit and block the electromagnetic wave to/against the imaging element section, the transmission/block section being disposed at an aperture stop position in the imaging optical system, an actuator configured to drive the transmission/block section to move back and forth to be changed in state between transmission and blocking, and an output section configured to produce an image signal output, the image signal output being differential signaling between a pixel output from the imaging element section when the transmission/block section is in the state of transmission, and a pixel output from the imaging element section when the transmission/block section is in the state of blocking.

An imaging method according to an embodiment of the present disclosure is for an imaging apparatus that includes an imaging element section configured to include a plurality of pixels, and an imaging optical system configured to form an image on the imaging element section, the image being formed by an electromagnetic wave from the outside. The method includes driving a transmission/block section to move back and forth to be changed in state between transmission and blocking, the transmission/block section being disposed at an aperture stop position in the imaging optical system, and the transmission/block section transmitting and blocking the electromagnetic wave to/against the pixels in the imaging element section, and producing an image signal output, the image signal output being differential signaling between a pixel output from the imaging element section when the transmission/block section is in the state of transmission, and a pixel output from the imaging element section when the transmission/block section is in the state of blocking.

According to the embodiments of the present disclosure, the transmission/block section configured to transmit and block the electromagnetic waves to/against the pixels in the imaging element section is provided at the aperture stop position in the imaging optical system. The aperture stop position is where incident luminous fluxes coming from each angle of view mainly gather. With the transmission/block section disposed at the aperture stop position as such, the resulting small-sized transmission/block section can provide the effective state of transmission and blocking.

Note that the aperture stop position is in the vicinity of the area where the aperture stops are formed in the imaging optical system, and is where incident luminous fluxes coming from each angle of view mainly gather. The expression of "disposed at the aperture stop position" means that the transmission/block section is disposed to be adjacent to the members each being the aperture stop not via any other optical element, or a part of the transmission/block section is integrated with the aperture-stop members.

According to the embodiments of the present disclosure, the small-sized transmission/block section can transmit/block electromagnetic waves to/against the imaging element section. This realizes the considerable size reduction of the imaging apparatus in which the imaging element section is a pyroelectric element, for example.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 5 is a diagram illustrating an output signal from a pyroelectric element in the first embodiment;

FIGS. 6A and 6B are each a diagram illustrating an imaging optical system in a second embodiment;

FIGS. 7A and 7B are each a diagram illustrating an imaging optical system in a third embodiment;

FIGS. 8A and 8B are each a diagram illustrating an imaging optical system in a fourth embodiment;

FIG. 10 is a diagram illustrating a bimorph piezo element;

FIG. 11 is a diagram illustrating actuators using the bimorph piezo elements;

FIG. 12 is a diagram illustrating the Lorentz force;

FIGS. 14A and 14B are each a diagram illustrating the chassis configuration in the embodiments;

DETAILED DESCRIPTION

Hereinafter, embodiments of the present disclosure will be described in the following order. Imaging apparatuses according to the embodiments are each an infrared imaging apparatus using a pyroelectric sensor as an image sensor.

1. First Embodiment
1-1 Configuration of Imaging Optical System
1-2 Configuration of Imaging Apparatus
2. Second Embodiment
3. Third Embodiment
4. Fourth Embodiment
5. Fifth Embodiment
6. Bimorph Piezo Actuator
7. Lorentz Force Actuator
8. Exemplary Chassis Configuration of Imaging Optical System
9. Modified Examples 1. First Embodiment 1-1 Configuration of Imaging Optical System An imaging apparatus in a first embodiment is described. First of all, an imaging optical system is described by referring to FIGS. 1A and 1B.

Figure 1A:
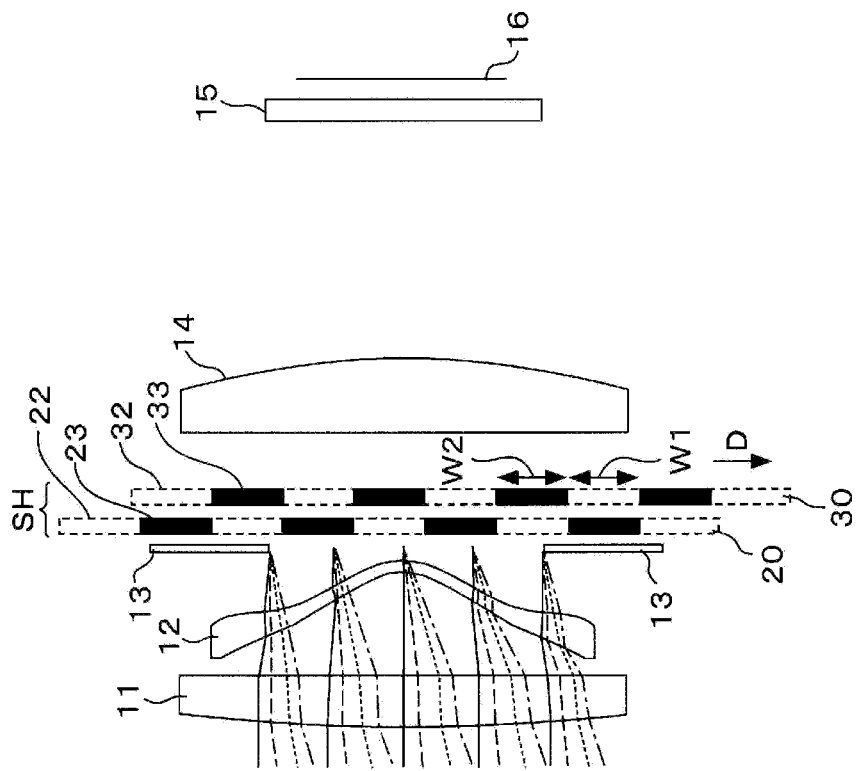
FIGS. 1A and 1B are each a diagram illustrating an imaging optical system according to a first embodiment of the present disclosure.
Figure 1B:
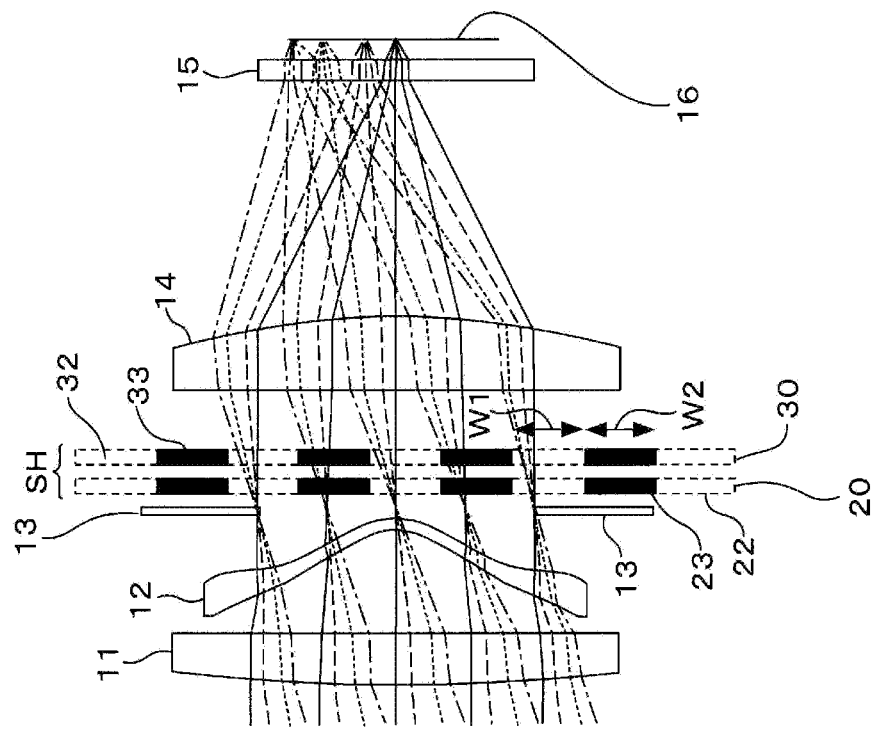

As shown in FIGS. 1A and 1B, as an imaging optical system, three lenses of a first lens 11, a second lens 12, and a third lens 14 are provided from the object side to the image surface side.

In this example, the first and third lenses 11 and 14 are each a plano-convex lens, and the second lens 12 is a meniscus lens.

Between any two of the first to third lenses 11 to 14, aperture stops 13 are provided. The example in FIGS. 1A and 1B shows the configuration in which the aperture stops 13 are provided between the second and third lenses 12 and 14.

At the position adjacent to the aperture stops 13, i.e., aperture stop position, there provided is a fixed slit plate 20 and a moving slit plate 30 next thereto. The fixed slit plate 20 and the moving slit plate 30 configure a transmission/block section SH.

With such an imaging optical system, incoming light (electromagnetic waves) guided thereby is directed to an image sensor 16 via a cover glass 15.

The components in the imaging optical system, i.e., the first, second, and third lenses 11, 12, and 14, the aperture stops 13, the fixed slit plate 20, and the moving slit plate 30, are all provided in the same lens barrel.

FIGS. 1A and 1B show the incoming rays being infrared rays, and specifically, the infrared rays indicated by solid lines are those gathered at the image height of 0 mm, the infrared rays indicated by dashed lines are those gathered at the image height of 1.5 mm, and the infrared rays indicated by dotted lines are those gathered at the image height of 3.5 mm, for example. The infrared rays indicated by alternate long and short dashed lines are those gathered at the image height of 5.0 mm, e.g., at the end portion of the image sensor 16, that is, those coming from the angle-view end portion. This is applicable also to FIGS. 6A to 9B that will be described later.

The image sensor 16 detects the infrared rays gathered by the imaging optical system as such, thereby obtaining an infrared detection signal related to the infrared rays emitted by the subject.

For obtaining such an infrared detection signal, the image sensor 16 is expected to include an infrared detection element such as pyroelectric element.

When the infrared detection element in use is a pyroelectric element as such, the image sensor 16 is provided with a shutter (transmission/block section SH) for periodically blocking the infrared rays entering thereto.

This is to be ready for the use of the pyroelectric element that does not output a value corresponding to a temperature itself but outputs a value corresponding to a temperature difference (temperature change). That is, the shutter periodically changes the state between transmission and blocking for the infrared rays entering the pyroelectric element so as to intentionally produce a temperature difference. This is to obtain an image with an appropriate temperature distribution image (infrared image) also for a not-moving object.

In the first embodiment, as the imaging apparatus provided with such an imaging optical system including at least the first and second lenses 11 and 12, the aperture stops 13, and the third lens 14, and the image sensor 16 using the pyroelectric element, configured is an imaging apparatus corresponding mainly to the far-infrared radiation area (8 μm to 12 μm), and implementing the size reduction.

Therefore, the transmission/block section SH, i.e., the fixed slit plate 20 and the moving slit plate 30, is provided at the aperture stop position.

Note that the aperture stop position is in the vicinity of the area where the aperture stops 13 are formed in the imaging optical system, and is where incident luminous fluxes coming from each angle of view mainly gather. For convenience, FIGS. 1A and 1B show the configuration in which the slit plates, i.e., the fixed slit plate 20 and the moving slit plate 30, are somewhat away from the aperture stops 13, but are actually provided as close as possible to the aperture stops 13.

Figure 2:
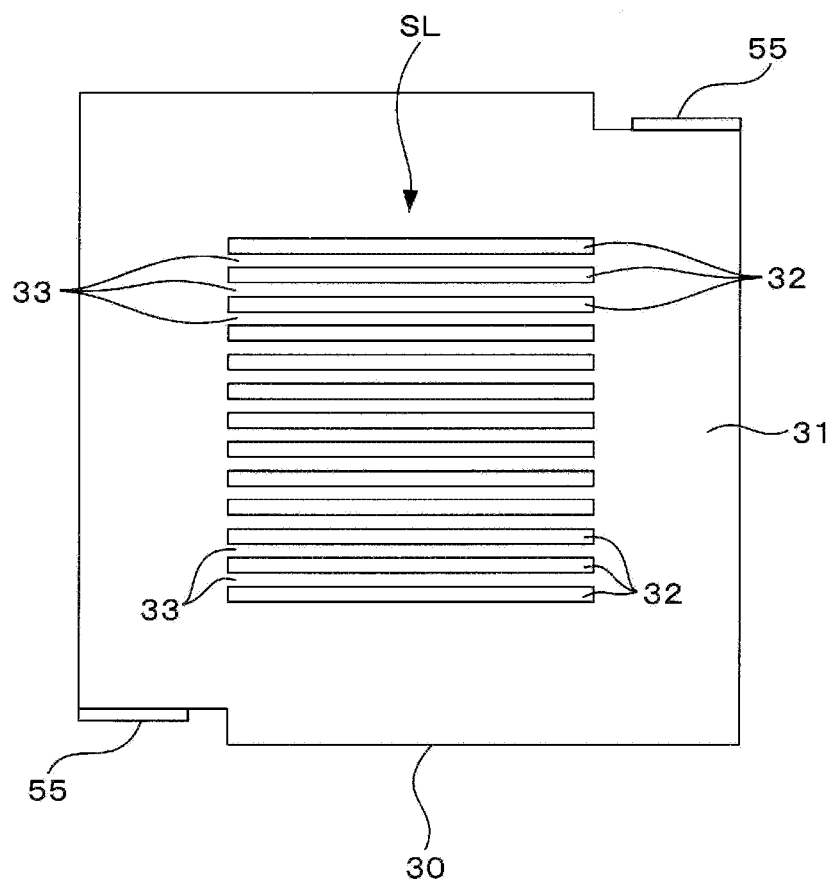
FIG. 2 is a diagram illustrating a moving slit plate in the first embodiment.

FIG. 2 shows a plan view of the moving slit plate 30.

As shown in FIG. 2, the moving slit plate 30 is so configured that a flat-shaped body 31 is formed with slits SL. The slits SL form transmission sections 32 and block sections 33. Herein, in the slits SL, the transmission sections 32 and the block sections 33 are formed alternately with the same width, which is the length thereof in the perpendicular direction (vertical direction in the drawing) with respect to the direction of the slits (lateral direction in the drawing).

This moving slit plate 30 is formed to have the slits by etching the flat-shaped body 31 made of aluminum or copper, for example.

Although the details will be described later, the flat-shaped body 31 is configured to be driven to move back and forth by an actuator by two portions thereof (upper right and lower left portions in FIG. 2) being connected to junction sections 55 of the actuator.

In FIGS. 1A and 1B, the moving slit plate 30 is shown as the cross-sectional view of the slits SL. In FIGS. 1A and 1B, the block sections 33 are solid filled, and the transmission sections 32 are indicated by dashed lines.

The fixed slit plate 20 is fixedly provided to be adjacent to the aperture stops 13, and has the flat-shaped body formed with the slits SL similarly to the moving slit plate 30. As such, as shown in FIGS. 1A and 1B, in the fixed slit plate 20, the transmission sections 22 (dashed-line sections) and the block sections 23 (solid-filled sections) are alternately formed.

As is known from FIGS. 1A and 1B, in the fixed slit plate 20 and the moving slit plate 30, W1=W2 is established, where W1 denotes the width of the transmission sections 22 and 32, i.e., the transmission-section width, and W2 denotes the width of the block sections 23 and 33, i.e., the block-section width. That is, in the fixed slit plate 20 and the moving slit plate 30, the ratio between the transmission-section width W1 and the block-section width W2 is 1:1.

FIGS. 1A and 1B show the fixed slit plate 20 and the moving slit plate 30 in the transmission state and the blocking state, respectively.

First of all, FIG. 1A shows the transmission state. As to the fixed slit plate 20 and the moving slit plate 30 being adjacent to each other, in the transmission state, the moving slit plate 30 is positioned against the fixed slit plate 20 to have overlap between their block sections 23 and 33, and their transmission sections 22 and 32.

In this transmission state, the incoming light passes through the transmission sections 22 and 32, and eventually reaches the image sensor 16.

On the other hand, FIG. 1B shows the blocking state. In the blocking state, the moving slit plate 30 is positioned against the fixed slit plate 20 to have overlap between the block sections 23 and the transmission sections 32, and the transmission sections 22 and the block sections 33. That is, the moving slit plate 30 in the state of FIG. 1A is moved in the direction of an arrow D by a slit width, and the block sections (23 and 33) entirely block the inner-diameter portion of each of the aperture stops 13.

As such, in the blocking state, the incoming light is entirely blocked by the block sections 33 and 23, i.e., the incoming light is blocked against the image sensor 16.

By being driven to move back and forth, the moving slit plate 30 is changed in position between the state of FIG. 1A and the state of FIG. 1B so that the incoming light is either passed or blocked before reaching the image sensor 16. This is the shutter operation with respect to the image sensor 16.

Figure 3A:
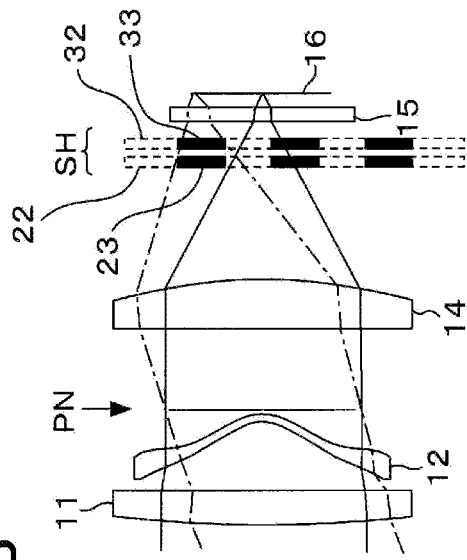
FIGS. 3A to 3C are each a diagram illustrating the layout in which the moving slit plate in the first embodiment is disposed at an aperture stop position.
Figure 3C:
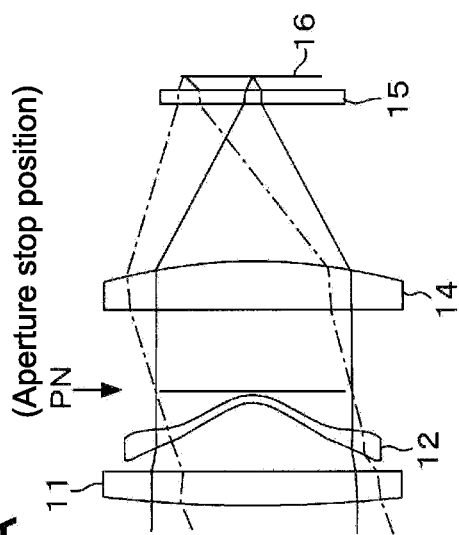
Figure 3B:
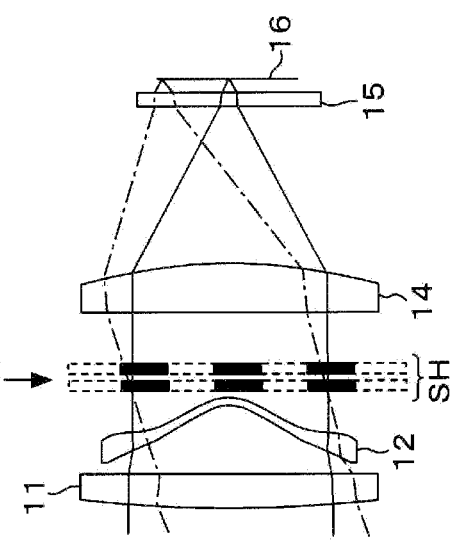

By referring to FIGS. 3A to 3C, described are advantages of providing the transmission/block section SH, i.e., the fixed slit plate 20 and the moving slit plate 30, at the aperture stop position.

FIG. 3A shows light rays (indicated by solid lines) entering pixels at the center portion of the image sensor 16, i.e., at the image height of 0 mm, and light rays (indicated by alternate long and short dashed lines) entering pixels at the end portion thereof, e.g., at the image height of 5.0 mm.

As is known from FIG. 3A, at the aperture stop position PN, the light rays entering the center portion and those entering the end portion are all the same luminous fluxes, i.e., having the similar amount of light, but not at the remaining portions.

FIG. 3B shows the transmission state when the transmission/block section SH is provided not at the aperture stop position PN.

In this case, the light rays entering the center portion are allowed to mostly go through the transmission/block section SH by passing through the transmission sections 32. On the other hand, although the transmission/block section SH is in the transmission state, i.e., the shutter-open state, the light rays entering the end portion are not allowed to go through the transmission/block section SH as are mostly blocked by the block sections 33.

FIG. 3C shows the transmission state when the transmission/block section SH is provided at the aperture stop position PN.

As is known from FIG. 3C, at the aperture stop position PN, the light rays entering the center portion and those entering the end portion are all the same luminous fluxes, i.e., having the similar amount of light. That is, no matter at what angle of view, the loss of light by the block sections is about the same.

That is, with such a configuration in this example, i.e., the transmission/block section SH is provided at the aperture stop position PN, in the transmission state, light rays passing through the pixels are all uniform in amount. The transmission/block section SH herein is a combination of the fixed slit plate 20 and the moving slit plate 30 each formed with the slits SL serving as the transmission sections 22, and 32 and the block sections 23 and 33.

Figure 16:
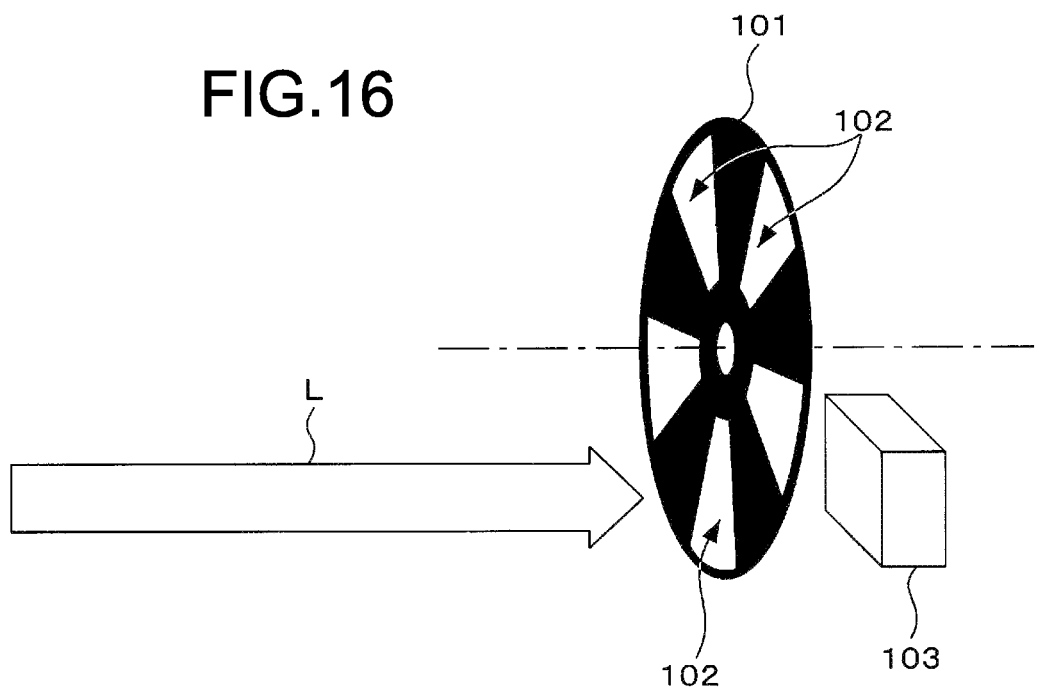
FIG. 16 is a diagram illustrating a pervious imaging apparatus using an optical chopper.

In other words, for achieving such appropriate light transmission including light rays entering the end portion with the configuration of FIG. 3B, i.e., the transmission/block section SH is not provided at the aperture stop position PN, a shutter is expected to be provided including a large-sized transmission section to be ready for all light rays, e.g., the optical chopper 101 of FIG. 16. If this is the configuration, the transmission/block section SH is inevitably increased in size. In this example, on the other hand, by being provided at the aperture stop position PN where luminous fluxes are gathered in the same diameter, the transmission/block section SH is not necessarily increased in size to achieve amount-uniform light transmission to the image sensor 16 no matter at which portion, i.e., the center portion or the end portion. That is, the transmission/block section SH can be successfully reduced in size.

1-2. Configuration of Imaging Apparatus

Figure 4:
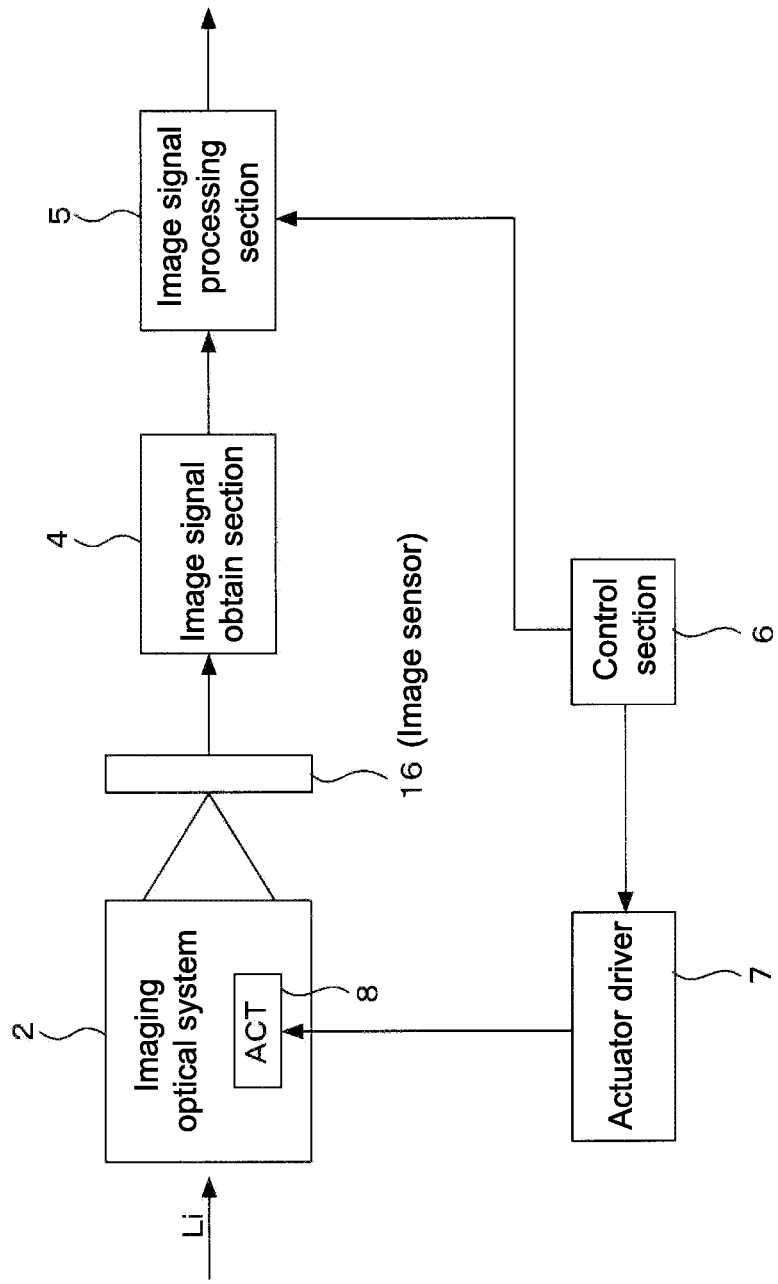
FIG. 4 is a block diagram showing the configuration of an imaging apparatus in the first embodiment.

FIG. 4 shows the configuration of an imaging apparatus of the first embodiment including the imaging optical system as above.

As shown in FIG. 4, an imaging apparatus 1 in this embodiment is configured to include the imaging optical system 2, the image sensor 16, an image signal obtain section 4, an image signal processing section 5, a control section 6, an actuator driver 7, and an actuator 8.

As described above by referring to FIGS. 1A and 1B, the imaging optical system 2 is configured to include the first, second, and third lenses 11, 12, and 14, the aperture stops 13, and the transmission/block section SH, i.e., the fixed slit plate 20, and the moving slit plate 30.

The imaging optical system 2 gathers infrared light (infrared rays) on the imaging surface (image surface) of the image sensor 16. The infrared light comes from a subject (object), which is denoted as incoming light Li in FIGS. 1A and 1B.

The image sensor 16 detects the infrared rays gathered by the imaging optical block 2 as such, thereby obtaining an infrared detection signal related to the infrared rays emitted by the subject. The image sensor 16 in this example is configured by pyroelectric elements as described above.

In the image sensor 16, the incoming light Li forms an image on the pixels (pyroelectric elements) intermittently in response to the state change of the transmission/block section SH in the imaging optical system 2, i.e., state change between the transmission state of FIG. 1A and the blocking state of FIG. 1B

FIG. 5 shows an output signal from each of the pixels in the image sensor 16.

In FIG. 5, "TA" denotes a period when the transmission/block section SH is not in motion, "TB" denotes a period when the transmission/block section SH shows the state change from blocking to transmission, and "TC" denotes a period when the transmission/block section SH shows the state change from transmission to blocking.

In the period TA, the transmission/block section SH is not in motion, and as long as the subject does not move, the pixel output remains 0V.

In the period TB, when the transmission/block section SH shows the state change from blocking to transmission, the output voltage shows an increase in a positive direction due to electromagnetic waves entering the pixels.

Next, in the period TC, when the transmission/block section SH shows the state change from transmission to blocking, the output voltage shows a decrease in a negative direction because the electromagnetic waves are blocked.

Thereafter, in response to the back-and-forth movement of the moving slit plate 30 in the transmission/block section SH, the output repeatedly shows a change from/to the increase in the period TB to/from the decrease in the period TC.

With such a pixel output, an output differential at the peak, i.e., a voltage differential between the voltage value being the brightness with the incoming light and the voltage value being the brightness with the incoming light being blocked, is the real subject-temperature output of the pixels. By repeating such an operation, the image sensor 16 functions for thermography.

The image signal obtain section 4 obtains an infrared image signal with the input of an infrared detection signal coming from the image sensor 16, i.e., an output signal from each of the pixels as shown in FIG. 5 (pixel herein is an infrared detection element as a pyroelectric element). That is, the value of an output differential at the peak of an output signal from a pixel is regarded as a subject-temperature detection signal from the pixel. The image signal obtain section 4 then outputs the subject-temperature detection signal from all of the pixels to the component subsequent thereto as the infrared image signal.

The image signal processing section 5 performs various types of image signal processing on the infrared image signal obtained by the image signal obtain section 4, e.g., black level correction, pixel defect correction, aberration correction, optical shading correction, lens distortion correction, temperature adjustment, calculation of a distance change, and coding.

The output from the image signal processing section 5 is sent to a display (image display apparatus) and others on the outside of the imaging apparatus via an interface (not shown), for example.

The control section 6 exerts control over the components in the imaging apparatus 1, e.g., issues a command for process execution in the image signal processing section 5, or makes coefficient settings. The control section 6 also exerts drive control over the moving slit plate 30 in the transmission/block section SH.

The actuator 8 drives the moving slit plate 30 to move back and forth in the imaging optical system 2.

The actuator 8 driving the moving slit plate 30 as such is exemplified by a Lorentz force actuator, a polymer actuator, an electromagnetic actuator, and a piezo actuator. Among these actuators, a description is given later about the configuration of a bimorph piezo actuator being one type of the piezo actuator using bimorph piezo elements, and that of the Lorentz force actuator.

The actuator 8 is driven by an electric power applied by the actuator driver 7. The actuator driver 7 applies the electric power to drive the actuator 8 in response to a command issued thereto by the control section 6. As a result, the moving slit plate 30 is driven to be alternately changed in state between transmission and blocking.

As such, described is the first embodiment in which the fixed slit plate 20 and the moving slit plate 30 form the transmission/block section SH, and the transmission/block section SH is disposed at the aperture stop position. This accordingly allows size reduction of the transmission/block section SH, thereby favorably leading to size reduction also of the imaging apparatus using the image sensor 16 including pyroelectric elements.

Especially, to form the transmission/block section SH, the fixed slit plate 20 and the moving slit plate 30 both formed with the slits SL may be disposed in the area where luminous fluxes come, i.e., at the aperture stop position. This realizes considerable size reduction compared with the optical chopper 101 of FIG. 16, for example. What is better, the moving slit plate 30 is not long in stroke as is configured to move back and forth only by the slit width. As such, these contribute to the size reduction of the imaging apparatus.

2. Second Embodiment

In the below, described is the configuration of the imaging optical system in second to fifth embodiments, especially the configuration of the transmission/block section SH therein. In the embodiments below, the entire configuration of the imaging apparatus is assumed to be similar to that of FIG. 4 referred to in the above.

FIGS. 6A and 6B each show the configuration of an imaging optical system in the second embodiment. FIG. 6A shows the transmission state, and FIG. 6B shows the blocking state.

In FIGS. 6A and 6B, the components, i.e., the first, second, and third lenses 11, 12, and 14, the aperture stops 13, the cover glass 15, and the image sensor 16, are similar to those in FIGS. 1A and 1B.

In the second embodiment, the transmission/block section SH is configured by the fixed slit plate 20, and two moving slit plates 30A and 30B.

In the transmission/block section SH, at the aperture stop position, the moving slit plates 30A and 30B are disposed to sandwich therebetween the fixed slit plate 20.

The fixed slit plate 20 is provided with the transmission sections 22 (dashed-line sections) and the block sections 23 (solid-filled sections). Similarly, the moving slit plates 30A and 30B are each provided with the transmission sections 32 (dashed-line sections) and the block sections 33 (solid-filled sections).

In the second embodiment, in the fixed slit plate 20 and the moving slit plates 30A and 30B, the ratio between the transmission-section width W1 and the block-section width W2 is 2:1.

Herein, the moving slit plates 30A and 30B are driven separately by each corresponding actuator (not shown). The moving slit plate 30A is driven to move back and forth between positions of FIGS. 6A and 6B, i.e., FIG. 6B shows the position thereof after movement in the direction of an arrow DA. The moving slit plate 30B is driven to move back and forth between position of FIGS. 6A and 6B, i.e., FIG. 6B shows the position thereof after movement in the direction of an arrow DB.

In the transmission state of FIG. 6A, the fixed slit plate 20 and the moving slit plates 30A and 30B have overlap between their block sections 23 and 33, and their transmission sections 22 and 32. Therefore, the incoming light passes through the transmission sections 22 and 32, and reaches the image sensor 16.

On the other hand, in the blocking state of FIG. 6B, the moving slit plates 30A and 30B are positioned to have overlap between their block sections 33 and the transmission sections 22 of the fixed slit plate 20. The block sections (23 and 33) thus entirely block the inner-diameter portion of each of the aperture stops 13. As such, the incoming light is blocked against the image sensor 16.

The transmission/block section SH in the second embodiment as such is favorably reduced in size as is in the first embodiment, and the following effects are produced thereby.

First of all, in the fixed slit plate 20 and the moving slit plates 30A and 30B, the ratio between the transmission-section width W1 and the block-section width W2 is 2:1. This is because, as is known from FIG. 6B, to be in the blocking state, the moving slit plates 30A and 30B operate in pairs to block, by their block sections 33, each corresponding transmission section 22 of the fixed slit plate 20. This thus allows, in the transmission state of FIG. 6A, the incoming light to pass through the area of about ⅔ of the inner-diameter surface of each of the aperture stops 13. This means that the amount of light entering the image sensor 16 is increased compared with the transmission state of FIG. 1A in the first embodiment described above, i.e., the incoming light is allowed to pass through the area of about ½ of the inner-diameter surface of each of the aperture stops 13. As such, in the second embodiment, the imaging sensitivity is better than that in the first embodiment.

The moving slit plates 30A and 30B are driven to move back and forth in the opposite directions as referred to as the directions of the arrows DA and DB. This favorably reduces the vibration noise that is generated by the continuous back-and-forth movement of the moving slit plates.

Because the pyroelectric elements in the image sensor 16 have the piezoelectric characteristics, the addition of a vibration component thereto generates noise on any image detected by infrared rays. Therefore, any increase of vibration due to the movement of the moving slit plates is not considered desirable because that degrades the quality of the infrared image signal.

In the second embodiment, the two moving slit plates 30A and 30B are driven to move in the opposite directions. That is, with the state change from transmission to blocking, the moving slit plate 30A is moved in the DA direction, and the moving slit plate 30B is moved in the DB direction. With the state change from blocking to transmission, the moving slit plate 30A is moved in the DB direction, and the moving slit plate 30B is moved in the DA direction.

By moving the moving slit plates in the opposite directions as such, the vibration during their movement is cancelled out so that the vibration to be transferred to the image sensor 16 is reduced. This accordingly prevents the vibration noise from being generated so that the resulting infrared image signal has better quality.

3. Third Embodiment

Next, FIGS. 7A and 7B each show the configuration of an imaging optical system in the third embodiment.

FIG. 7A shows the transmission state, and FIG. 7B shows the blocking state.

In FIGS. 7A and 7B, the components, i.e., the first, second, and third lenses 11, 12, and 14, the aperture stops 13, the cover glass 15, and the image sensor 16, are similar to those in FIGS. 1A and 1B. In this embodiment, the first and second lenses 11 and 12 are each a meniscus lens, and the aperture stops 13 are disposed between the first and second lenses 11 and 12, for example. The lens configuration and layout are not restricted to those in the example of FIGS. 1A and 1B, and any other lens configuration and layout are also possible, e.g., those in FIGS. 7A and 7B. Moreover, the shape and number of the lenses may be also varied.

In this third embodiment, the transmission/block section SH is configured by the fixed slit plate 20, and two moving slit plates 30A and 30B. This is similar to the second embodiment, but herein, the fixed slit plate 20 serves also as the aperture stops 13. That is, an aperture/slit plate 40 is provided.

In this aperture/slit plate 40, the area around the circular aperture functions as an aperture stop. The aperture is not a simple aperture, and is formed with a large number of slits in the inner-diameter portion thereof. As shown in FIGS. 7A and 7B, the aperture/slit plate 40 is provided with the transmission sections 22 (dashed-line sections), and the block section 23 (solid-filled sections).

The aperture/slit plate 40 is provided to be adjacent to the moving slit plate 30A, and the moving slit plate 30B is provided next thereto. The moving slit plates 30A and 30B are also each provided with the transmission sections 32 (dashed-line sections), and the block sections 33 (solid-filled sections) similarly to the fixed slit plate 20.

In the third embodiment, in the fixed slit plate 20 and the moving slit plates 30A and 30B, the ratio between the transmission-section width W1 and the block-section width W2 is 2:1.

Herein, the moving slit plates 30A and 30B are driven separately by each corresponding actuator (not shown).

The moving slit plate 30A is driven to move back and forth between positions of FIGS. 7A and 7B, i.e., FIG. 7B shows the position thereof after movement in the direction of the arrow DA. The moving slit plate 30B is driven to move back and forth between positions of FIGS. 7A and 7B, i.e., FIG. 7B shows the position thereof after movement in the direction of the arrow DB.

In the transmission state of FIG. 7A, the fixed slit plate 20 and the moving slit plates 30A and 30B have overlap between their block sections 23 and 33, and their transmission sections 22 and 32. Therefore, the incoming light passes through the transmission sections 22 and 32, and reaches the image sensor 16.

On the other hand, in the blocking state of FIG. 7B, the moving slit plates 30A and 30B are positioned to have overlap between their block sections 33 and the transmission sections 22 of the fixed slit plate 20. The block sections (23 and 33) thus entirely block the inner-diameter portion of each of the aperture stops 13. As such, the incoming light is blocked against the image sensor 16.

In the third embodiment, the transmission/block section SH is provided at the aperture stop position similarly to the first embodiment, and thus is favorably reduced in size.

Moreover, similarly to the second embodiment, in the fixed slit plate 20 and the moving slit plates 30A and 30B, the ratio between the transmission-section width W1 and the block-section width W2 is 2:1. This thus increases, in the transmission state, the amount of light entering the image sensor 16 so that the imaging sensitivity is accordingly improved.

Moreover, the moving slit plates 30A and 30B are driven to move back and forth in the opposite directions, thereby successfully preventing the vibration noise from being generated, and leading to the infrared image signal having better quality.

In addition to such effects, the use of the aperture/slit plate 40 favorably simplifies the configuration.

Alternatively, the aperture/slit plate 40 may be used also in the configuration of FIGS. 1A and 1B. That is, using the aperture/slit plate 40 as an alternative to the aperture stops 13 and the fixed slit plate 20 in FIGS. 1A and 1B is surely an option.

4. Fourth Embodiment

Next, by referring to FIGS. 8A and 8B, described is the configuration of an imaging optical system in the fourth embodiment.

FIG. 8A shows the transmission state, and FIG. 8B shows the blocking state.

In FIGS. 8A and 8B, the components, i.e., the first, second, and third lenses 11, 12, and 14, the aperture stops 13, the cover glass 15, and the image sensor 16, are similar to those in FIGS. 1A and 1B.

In this fourth embodiment, the transmission/block section SH is configured by the fixed slit plate 20, and three moving slit plates 30A, 30B, and 30C.

From the side of the aperture stops 13, these slit plates are disposed in order to be adjacent to each other, i.e., in order of the moving slit plate 30A, the fixed slit plate 20, the moving slit plate 30B, and the moving slit plate 30C.

The fixed slit plate 20 is provided with the transmission sections 22 (dashed-line sections), and the block sections 23 (solid-filled sections). Similarly, the moving slit plates 30A, 30B, and 30C are each provided with the transmission sections 32 (dashed-line sections), and the block sections 33 (solid-filled sections).

In this fourth embodiment, in the fixed slit plate 20 and the moving slit plates 30A, 30B, and 30C, the ratio between the transmission-section width W1 and the block-section width W2 is 3:1.

Herein, the moving slit plates 30A, 30B, and 30C are driven separately by each corresponding actuator (not shown).

The moving slit plate 30A is driven to move back and forth between positions of FIGS. 8A and 8B, i.e., FIG. 8B shows the position thereof after movement in the direction of the arrow DB by the block-section width W2.

The moving slit plate 30B is driven to move back and forth between positions of FIGS. 8A and 8B, i.e., FIG. 8B shows the position thereof after movement in the direction of the arrow DA by the block-section width W2.

The moving slit plate 30C is driven to move back and forth between positions of FIGS. 8A and 8B, i.e., FIG. 8B shows the position thereof after movement in the direction of the arrow DA by twice of the block-section width W2.

In the transmission state of FIG. 8A, the fixed slit plate 20 and the moving slit plates 30A, 30B, and 30C have overlap between their block sections 23 and 33, and their transmission sections 22 and 32. Therefore, the incoming light passes through the transmission sections 22 and 32, and reaches the image sensor 16.

On the other hand, in the blocking state of FIG. 8B, the moving slit plates 30A, 30B, and 30C are positioned to have overlap between their block sections 33, and the transmission sections 22 of the fixed slit plate 20. That is, the slit plates 30A, 30B, and 30C operate in a set to block, by their block sections 33, each corresponding transmission section 22 of the fixed slit plate 20. The block sections (23 and 33) thus entirely block the inner-diameter portion of each of the aperture stops 13. As such, the incoming light is blocked against the image sensor 16.

In such a fourth embodiment, with the transmission/block section SH provided at the aperture stop position similarly to the first embodiment, the size reduction thereof is favorably realized.

Moreover, the imaging sensitivity can be improved compared with that in the second and third embodiments. This is thanks to the ratio being 3:1 between the transmission-section width W1 and the block-section width W2. That is, in the transmission state of FIG. 8A, the amount of light entering the image sensor 16 is increased because the incoming light is allowed to pass through the area of about ¾ of the inner-diameter surface of each of the aperture stops 13.

Also in this embodiment, the moving slit plates 30A, and 30B and 30C are driven to move back and forth in the opposite directions. With a plurality of moving slit plates being driven in opposite directions as such, the vibration is favorably reduced so that the vibration noise to be on the infrared image signal is accordingly reduced.

Exemplified herein is the case of using the three moving slit plates 30A, 30B, and 30C. Alternatively, a larger number of the moving slit plates 30 may be provided, e.g., four moving slit plates. The larger number of the moving slit plates 30 leads to the wider transmission-section width W1 against the block-section width W2. This accordingly increases the amount of light passing therethrough in the transmission state, and thus is considered appropriate to improve the sensitivity. However, the larger number of the moving slit plates 30 results in the more complicated configuration.

Alternatively, also in the configuration of including three or more of a large number of moving slit plates 30, the aperture/slit plate 40 being a combination of the fixed slit plate 20 and the aperture stops 13 described in the fourth embodiment may be used. If this is the configuration, the components may be arranged in order of the aperture/slit plate 40, the moving slit plate 30A, the moving slit plate 30B, and the moving slit plate 30C.

5. Fifth Embodiment

By referring to FIGS. 9A and 9B, described next is the configuration of an imaging optical system as the fifth embodiment.

Figure 9A:
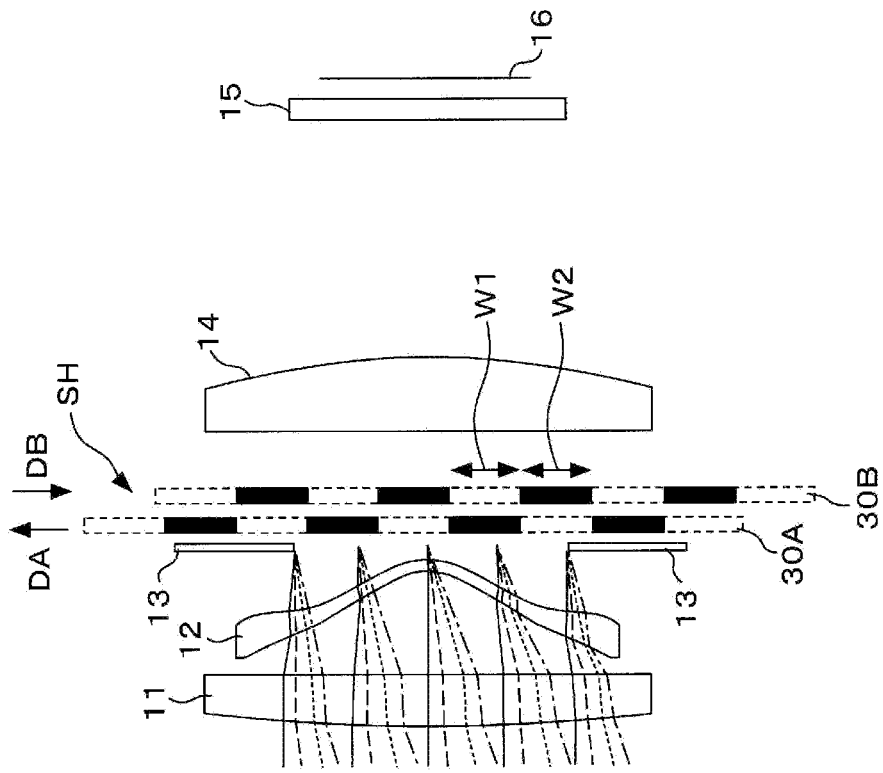
FIGS. 9A and 9B are each a diagram illustrating an imaging optical system in a fifth embodiment.
Figure 9B:
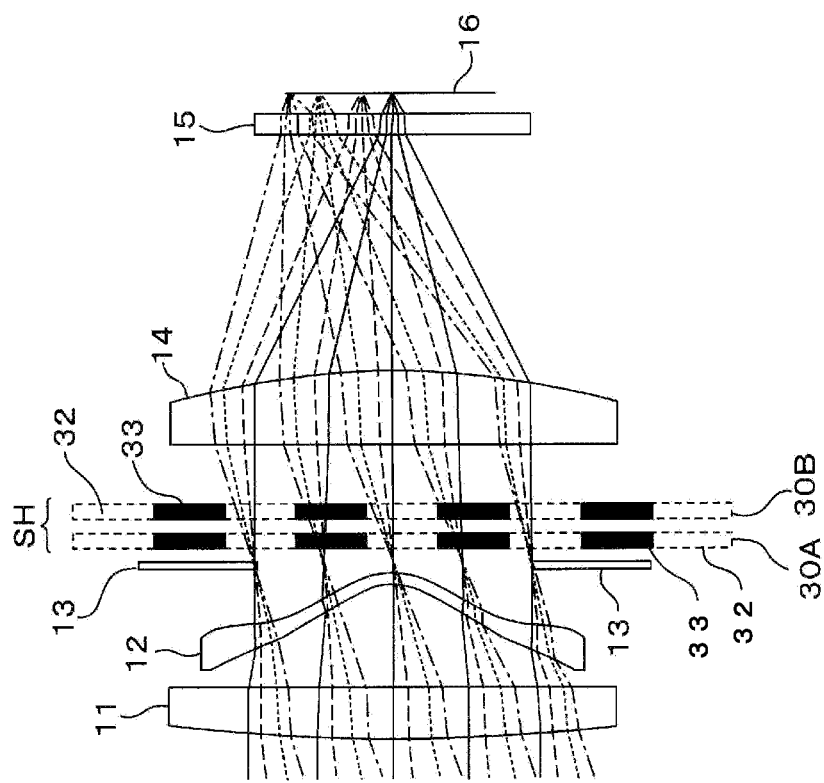

FIG. 9A shows the transmission state, and FIG. 9B shows the blocking state.

In FIGS. 9A and 9B, the components, i.e., the first, second, and third lenses 11, 12, and 14, the aperture stops 13, the cover glass 15, and the image sensor 16, are similar to those in FIGS. 1A and 1B.

In this fifth embodiment, the transmission/block section SH is configured by the two moving slit plates 30A and 30B. In this embodiment, the fixed slit plate 20 is not provided.

These two moving slit plates 30A and 30B are provided at the aperture stop position to be adjacent to each other.

The moving slit plates 30A and 30B are each provided with the transmission sections 32 (dashed-line sections), and the block sections 33 (solid-filled sections).

In this fifth embodiment, in the moving slit plates 30A and 30B, the ratio between the transmission-section width W1 and the block-section width W2 is 1:1.

The moving slit plates 30A and 30B are driven separately by each corresponding actuator (not shown).

The moving slit plate 30A is driven to move back and forth between positions of FIGS. 9A and 9B, i.e., FIG. 9B shows the position thereof after movement in the direction of the arrow DA by a half of the block-section width W2.

The moving slit plate 30B is driven to move back and forth between positions of FIGS. 9A and 9B, i.e., FIG. 9B shows the position thereof after movement in the direction of the arrow DB by a half of the block-section width W2.

In the transmission state of FIG. 9A, the moving slit plates 30A and 30B have overlap between their block sections 33, and their transmission sections 32. Therefore, the incoming light passes through the transmission sections 32, and reaches the image sensor 16.

On the other hand, in the blocking state of FIG. 9B, the moving slit plates 30A and 30B are positioned to have overlap between their transmission sections 32 and the block sections 33. As a result, the block sections 33 of the moving slit plates 30A and 30B entirely block the internal-diameter portion of each of the aperture stops 13. As such, the incoming light is blocked against the image sensor 16.

In such a fifth embodiment, with the transmission/block section SH provided at the aperture stop position similarly to the first embodiment, the size reduction thereof is favorably realized.

Also in this embodiment, the moving slit plates 30A and 30B are driven to move back and forth in the opposite directions. With a plurality of moving slit plates being driven in opposite directions as such, the vibration is favorably reduced so that the vibration noise to be on the infrared imaging signal is accordingly reduced.

Furthermore, the moving slit plates 30A and 30B are to be each moved only by a half of the block-section width W2, thereby reducing the stroke of the back-and-forth movement thereof. This accordingly leads to a reduced drive-signal amplitude in the actuator 8 so that the power consumption is accordingly reduced.

Exemplified herein is the case of using the two moving slit plates 30A and 30B. Alternatively, a larger number of the moving slit plates 30 may be provided, e.g., three moving slit plates. The larger number of the moving slit plates 30 leads to the wider transmission-section width W1 against the block-section width W2. This accordingly increases the amount of light passing therethrough in the transmission state, and thus is considered appropriate to improve the sensitivity.

6. Bimorph Piezo Actuator

As a specific example of the actuator 8 applicable in each of the embodiments described above, described now is the configuration of a bimorph piezo actuator.

FIG. 10 shows a bimorph piezo element 50. The bimorph piezo element 50 in FIG. 10 example is of a so-called parallel type, and is configured to include a center electrode 51, two piezoelectric elements 52, and two surface electrodes 53. The two piezoelectric elements 52 are of the same polarization direction (indicated by an arrow P).

The center electrode 51 and the surface electrodes 53 are each formed by a plate-like flexible member that serves also as an electrode.

The center electrode 51 is much longer than the remaining components, i.e., the piezoelectric elements 52 and the surface electrodes 53, in the upper direction in the drawing.

The two surface electrodes 53 are short-circuited to each other.

In such a bimorph piezo element 50, in response to application of a potential difference V1 between the center electrode 51 and the surface electrodes 53, the voltage applied thereto is opposite in polarity to the polarization direction of the right and left piezoelectric elements 52. As a result, one of the right and left piezoelectric elements 52 is extended, and the remaining is shrunk. This accordingly drives the elements in the direction of an arrow dAC in the drawing.

By referring to FIG. 11, described is the actuator 8 using such a bimorph piezo element 50.

The actuator 8 is configured by using two of the bimorph piezo elements 50.

As described by referring to FIG. 10, the bimorph piezo elements 50 are each configured to include the center electrode 51, the piezoelectric elements 52, and the surface electrodes 53. In addition thereto, the surface electrodes 53 are each provided on the surface side with a shield plate 54. This shield plate 54 is provided to cover the surface of the surface electrode 53, and is insulated therefrom.

In each of the bimorph piezo elements 50, the tip end portion of the center electrode 51 serves as the junction section 55 to keep hold of the slit plate, and this junction section 55 is connected to the moving slit plate 30. As already described above by referring to FIG. 2, the junction sections 55 are connected to the flat-shaped body 31 of the moving slit plate 30 at two portions diagonally opposite to each other.

In the configuration, the moving slit plate 30 is retained by the actuator 8 configured by a pair of the bimorph piezo elements 50 as such.

The two center electrodes 51 and the four shield plates 54 are all grounded. The four surface electrodes 53 are short-circuited to have a drive signal S1 from the actuator driver 7 shown in FIG. 4.

The drive signal S1 applied to the actuator 8 in the configuration of FIG. 11 is an alternating voltage whose polarity is repeatedly reversed at a predetermined cycle between +V1 and −V1, e.g., a sine-wave signal.

With the polarization and connection of the piezoelectric elements 52 described above, in response to a gradual increase in voltage level of the drive signal S1, i.e., increase to the +V1 side, the piezoelectric elements 52 are changed in shape so that the center electrode 51 and the surface electrodes 53 each being a flexible member become gradually deformed in the left direction in the drawing.

Conversely, in response to a gradual decrease in voltage level of the drive signal S1, i.e., decrease to the −V1 side, the center electrode 51 and the surface electrodes 53 become gradually deformed in the right direction in the drawing.

With such deformation, the moving slit plate 30 retained at the tip ends of a pair of the center electrodes 51 is moved back and forth in the direction of the arrow dAC. This back-and-forth movement realizes the states of transmission and blocking described in the embodiments above.

Note that the movement amount of the moving slit plate 30 is adjusted based on the level of the drive signal S1.

With the actuator 8 using the bimorph piezo elements 50 as such, the power consumption can be reduced compared with a Lorentz force actuator that will be described later, for example.

Moreover, the bimorph piezo element is to be thinner than a multilayer piezo element or others so that the resulting apparatus can be prevented from increasing in size.

The moving slit plate 30 is the one made of aluminum or copper formed with the slits by etching. Therefore, the moving slit plate 30 is electrically short-circuited to the center electrodes 51. If a drive voltage is applied to the center electrodes 51 short-circuited as such, the moving slit plate 30 may generate electric-field noise. The electric-field noise generated as such causes distortion of video when the image sensor 16 in use is a high-sensitivity imaging element.

For a solution, in this example, the center electrodes 51 are grounded, and the drive signal S1 is applied to the side of the surface electrodes 53.

The electric-field noise is generated also by application of a sine wave to the surface electrodes 53. Therefore, the shield plate 54 being a grounded conductive plate is provided on the surface side of each of the surface electrodes 53 so that video is protected from the electric-field noise.

7. Lorentz Force Actuator

Described now is a Lorentz force actuator as another example of the actuator 8.

The Lorentz force actuator has such an advantage of a lower cost than the piezo actuator.

FIG. 12 shows the principle of how the Lorentz force is generated.

Figure 13A:
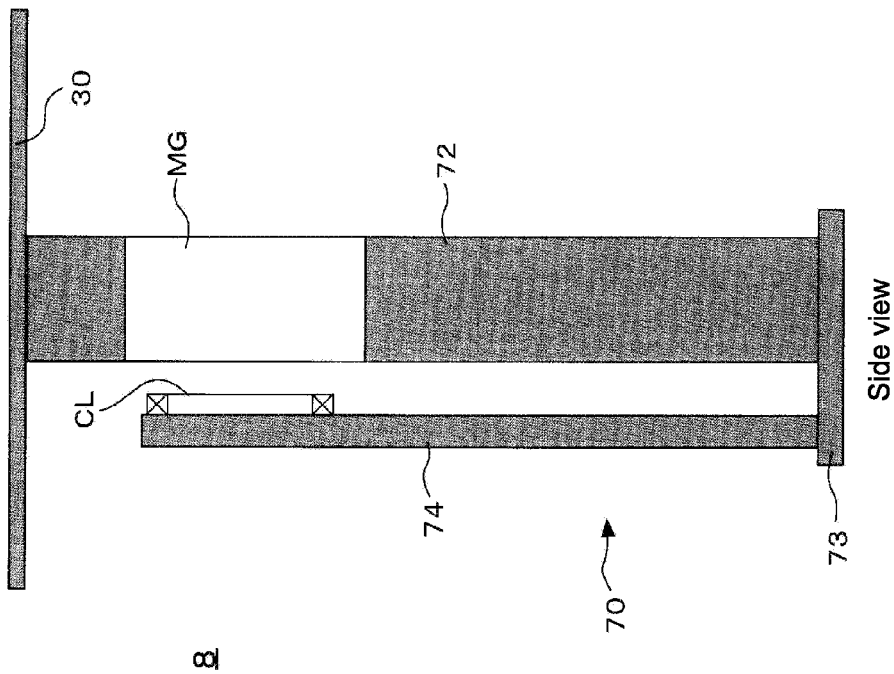
FIGS. 13A and 13B are each a diagram illustrating a Lorentz force actuator.
Figure 13B:
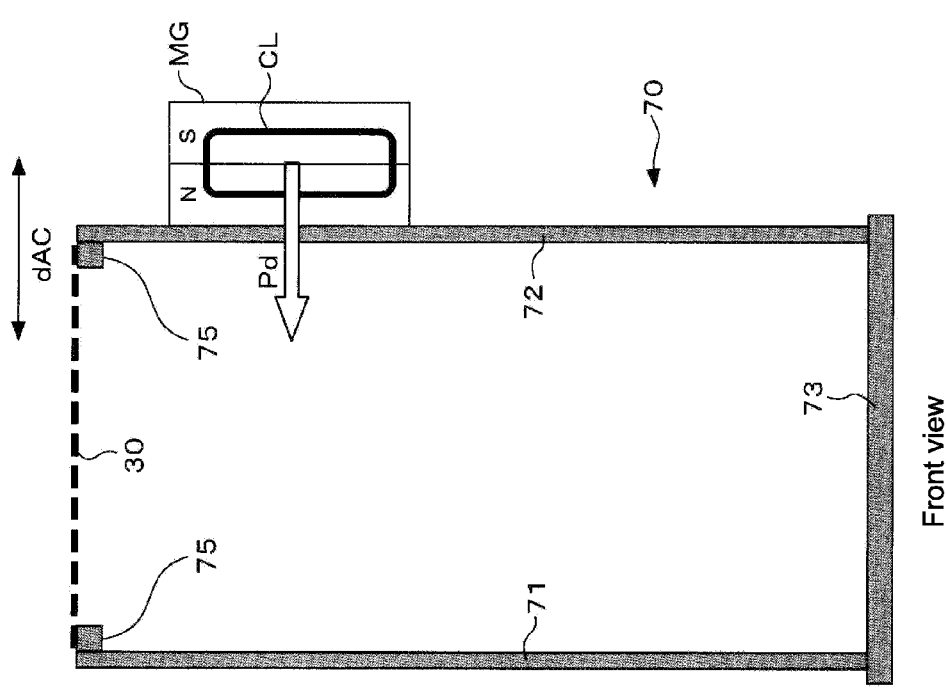

There exist magnetic fluxes in the vicinity of the surface of a magnet MG depending on the direction of magnetization. The magnetic fluxes are like those indicated by dotted arrows Md. When a current is provided to an opposing coil CL in the direction of solid arrows Cd, the thrust in proportion to the current is generated as arrows Pd in the drawing. FIGS. 13A and 13B show an example of driving the moving slit plate 30 using this thrust.

FIGS. 13A and 13B are respectively schematic front and side views of the actuator 8 using the Lorentz force.

This actuator 8 is configured by a pair of elastic plates 71 and 72, which are disposed on a base section 73. The elastic plates 71 and 72 each have a junction section 75 at the tip end, and to these junction sections 75, the moving slit plate 30 is connected and thus is retained thereby.

The elastic plate 72 is mounted with the magnet MG on the side surface.

As shown in FIG. 13B (not shown in FIG. 13A), the base section 73 is provided thereon with a fixed plate 74, and this fixed plate 74 is attached with the coil CL. In this state, the coil CL is disposed to oppose the magnet MG.

With the actuator 8 configured as such, the actuator driver 7 provides a drive current to the coil CL.

With a flow of current to the coil CL, the thrust in proportion to the current is generated in the direction of the arrows Pd so that the elastic plates 71 and 72 are deformed also in the direction of the arrows Pd.

With such deformation, the moving slit plate 30 is moved back and forth in the direction of the arrow dAC, and this back-and-forth movement realizes the states of transmission and blocking described in the embodiments above.

In the example of FIGS. 13A and 13B, the elastic plate 72 on the moving side is provided with the magnet MG, and the coil CL is provided at the position opposing on the fixed plate 74 side.

Alternatively, the coil CL may be provided to the elastic plate 72 on the moving side, and the magnet MG may be provided to the fixed plate 74.

There are advantages and disadvantages depending on which of the coil CL and the magnet MG is positioned on the fixed side (on the fixed plate 74).

The advantages of including the coil CL on the fixed side are the ease of feeding to the coil CL. If the coil CL is provided on the moving side, a feeding cable is vibrated with the movement of the moving slit plate 30. Therefore, a feeding cable for use is expected to be resistant to vibration. In this respect of not expecting such attention, providing the coil CL on the fixed side is thus desirable.

On the other hand, the disadvantages are the weight increase on the moving side. The magnet MG is generally heavier than the coil CL. Therefore, if the magnet MG is provided on the moving side, the weight increase on the moving side causes the increase of a drive current.

It is thus desirable to determine which of the coil CL and the magnet MG is to be on the moving side by considering all the advantages and disadvantages as such.

8. Exemplary Chassis Configuration of Imaging Optical System

As described in the embodiments above, the imaging optical system 2 is provided with the lenses (11, 12, and 14), the aperture stops 13, and the transmission/block section SH.

Described now is the chassis configuration of including such an imaging optical system 2, and the image sensor 16.

FIG. 14A shows the outer appearance of a chassis in which the imaging optical system 2 is accommodated, and FIG. 14B is a cross-sectional view thereof.

Herein, the optical system in the chassis is in the configuration of the third embodiment described by referring to FIGS. 7A and 7B.

As shown in FIGS. 14A and 14B, the chassis as a whole is a combination of a chassis body 60 and a base 61.

As shown in FIG. 14B, on the chassis body 60 side in the chassis, incorporated are the first lens 11, and the aperture/slit plate 40 (the aperture stops 13 and the fixed slit plate 20). On the base 61 side therein, the second and third lenses 12 and 14 are retained, and the image sensor 16 is disposed.

The moving slit plates 30A and 30B are also provided at the aperture stop position, i.e., to be adjacent to the aperture/slit plate 40.

The chassis is made of metal such as aluminum or resin, and using a conductive material such as conductive metal or conductive resin is appropriate. By forming the chassis using a conductive material and by grounding the resulting chassis, any video distortion by noise coming from the outside is favorably prevented.

Moreover, the chassis is desirably hermetically sealed not to attract dust and dirt that may cause malfunction of the moving slit plate 30.

Figures 15A, 15B:
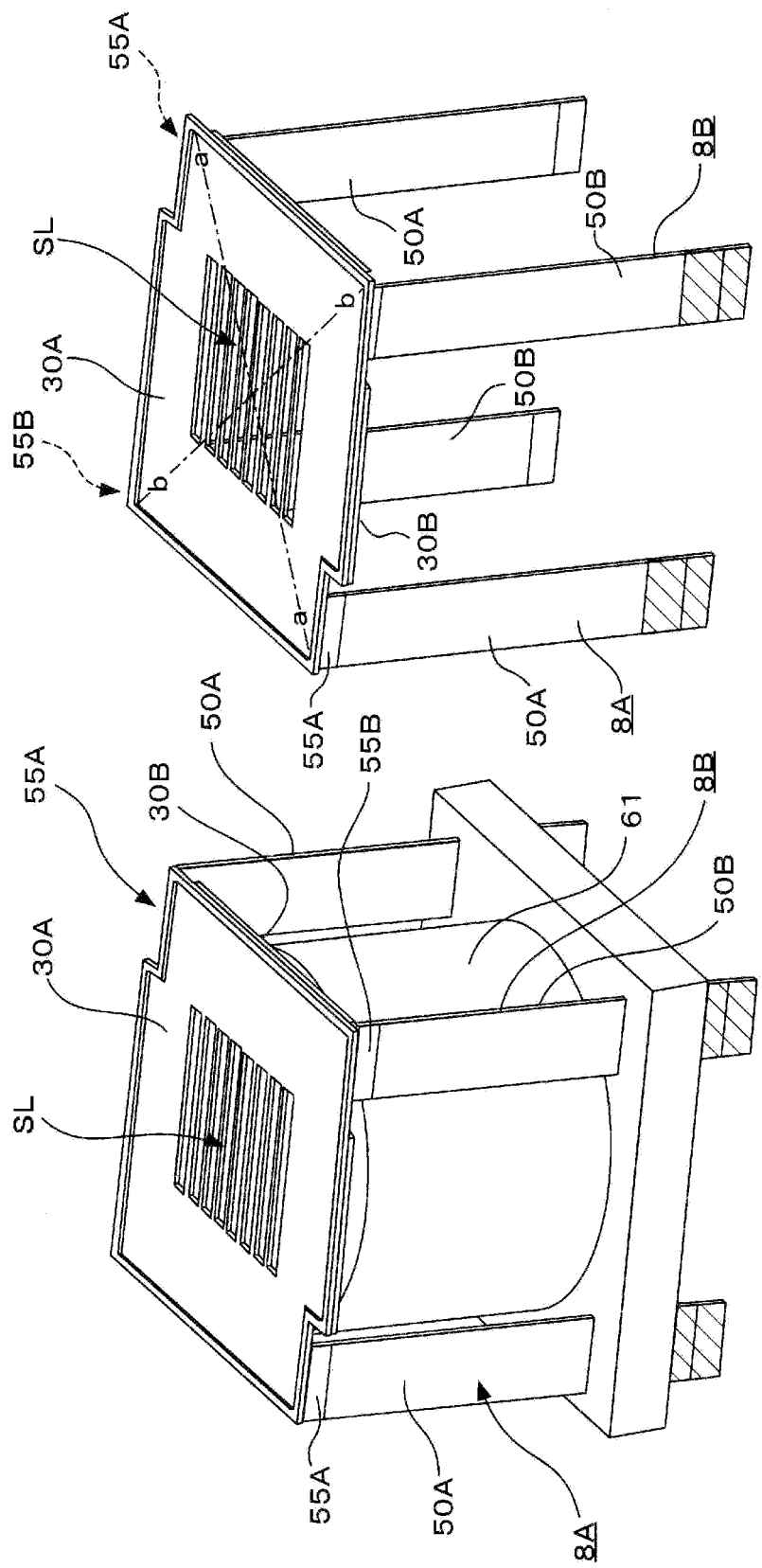
FIGS. 15A and 15B are each a diagram illustrating the layout of actuators in the chassis in the embodiments.

The actuator 8 is disposed as shown in FIGS. 15A and 15B. FIG. 15A shows actuators 8A and 8B disposed on the base 61. The actuators 8A and 8B are those using the bimorph piezo elements 50 described by referring to FIG. 11. FIG. 15B shows only the actuators 8A and 8B, and the moving slit plates 30A and 30B.

The moving slit plate 30A is retained by the actuators 8A. That is, the upper right and lower left end portions of the moving slit plate 30A in the drawing are connected to junction sections 55A (slit plate retention sections) of a pair of bimorph piezo elements 50A in the actuators 8A.

The moving slit plate 30B is retained by the actuators 8B. That is, upper left and lower right end portions of the moving slit plate 30B in the drawing are connected to junction sections 55B (slit plate retention sections) of a pair of bimorph piezo elements 50B in the actuators 8B.

That is, the two actuators 8A and 8B are so disposed that their bimorph piezo elements 50, i.e., the portions of the center electrodes 51 in FIG. 11, are alternately provided.

Specifically, the actuators 8A and 8B are so disposed that a line segment connecting the junction sections 55A of the actuator 8A in charge of driving the moving slit plate 30A, i.e., alternate long and short dashed lines a-a in FIG. 15B, is roughly orthogonal to a line segment connecting the junction sections 55B of the actuator 8B in charge of driving the remaining moving slit plate 30B, i.e., alternate long and short dashed lines b-b in FIG. 15B.

By disposing the actuators 8A and 8B to have the alternate long and short dashed lines a-a and b-b being orthogonal to each other, the actuators 8A and 8B occupy a smaller space in the chassis. Moreover, with the configuration in which the moving slit plates 30A and 30B are respectively retained by the actuators 8A and 8B at their two diagonally-opposite portions, the moving slit plates 30A and 30B are retained and moved with stability, and what is more, the actuators 8A and 8B are not disposed one on the other.

Note that the layout of the actuators as shown in FIGS. 15A and 15B is suitable when a plurality of moving slit plates 30 are in use. Therefore, such an actuator layout is suitable not only in the case of FIGS. 7A and 7B but also in the case of FIGS. 6A and 6B or 9A and 9B, i.e., suitable for the actuators 8A and 8B with the two moving slit plates 30A and 30B.

Moreover, the actuator layout is also applicable to a case with a larger number of the moving slit plates 30 as shown in FIGS. 8A and 8B. As an example, the actuators 8A and 8B for the moving slit plates 30A and 30B in FIGS. 8A and 8B may be laid out as shown in FIGS. 15A and 15B, and the actuators for the moving slit plate 30C may be so laid out that the two bimorph piezo elements are provided next to the actuator 8A, for example.

9. Modified Examples

While the embodiments of the present disclosure have been described, the foregoing description is in all embodiments illustrative and not restrictive, and it is understood that numerous other modifications and variations may be devised.

First of all, in the fixed slit plate 20 and the moving slit plate 30, the slits may be formed differently, i.e., the shape and layout pattern of the transmission sections 22 and 32, and those of the block sections 23 and 33.

That is, the moving slit plate 30 described above is formed with the linear slits (precisely, the transmission sections 32 are rectangular), but the slits may be curved, bent, or crimped, for example. Still alternatively, the transmission sections 32 may be in a staggered arrangement to be in a checkered arrangement with the block sections 33.

That is, the configuration of the transmission/block section SH is not restrictive as long as it includes a plurality of slit plates, and creates the states of transmission and blocking by the partial or entire movement of the slit plates.

Further, exemplified in the second to fourth embodiments is the case that a plurality of moving slit plates 30 are driven in the opposite directions. Alternatively, all of the moving slit plates 30 may be driven in the same direction.

Still further, exemplified above is the case that the optical system includes three lenses. The present disclosure is applicable also to an imaging optical system including four or more lenses, or two or less lenses, for example.

The present disclosure is also in the following structures.

(1) An imaging apparatus, including:

an imaging element section configured to include a plurality of pixels;

an imaging optical system configured to form an image on the imaging element section, the image being formed by an electromagnetic wave from an outside;

a transmission/block section configured to transmit and block the electromagnetic wave to/against the imaging element section, the transmission/block section being disposed at an aperture stop position in the imaging optical system;

an actuator configured to drive the transmission/block section to move back and forth to be changed in state between transmission and blocking; and an output section configured to produce an image signal output, the image signal output being differential signaling between a pixel output from the imaging element section when the transmission/block section is in the state of transmission, and a pixel output from the imaging element section when the transmission/block section is in the state of blocking.

(2) The imaging apparatus according to (1), in which the transmission/block section is formed to include a plurality of slit plates.

(3) The imaging apparatus according to (1) or (2), in which the transmission/block section is formed to include a fixed slit plate and a moving slit plate, the moving slit plate being driven by the actuator to move back and forth.

(4) The imaging apparatus according to (3), in which the moving slit plate includes a plurality of moving slit plates.

(5) The imaging apparatus according to (3) or (4), in which the moving slit plate includes a plurality of moving slit plates, the plurality of moving slit plates being driven to move back and forth in opposite directions.

(6) The imaging apparatus according to any one of (3) to (5), in which the fixed slit plate is configured to serve also as an aperture stop in the imaging optical system.

(7) The imaging apparatus according to (2), in which the plurality of slit plates in the transmission/block section are all moving slit plates, the moving slit plates being driven by the actuator to move back and forth.

(8) The imaging apparatus according to (2) or (7), further including:

a plurality of moving slit plates, the plurality of moving slit plates being driven to move back and forth in opposite directions.

(9) The imaging apparatus according to any one of (1) to (8), in which the actuator is any of a Lorentz force actuator, polymer actuator, an electromagnet actuator, and a piezo actuator.

(10) The imaging apparatus according to any one of (1) to (8), in which the actuator is a piezo actuator using a bimorph piezo element, and the bimorph piezo element is formed to include a center electrode connected to the transmission/block section, the center electrode being grounded, a piezoelectric element provided on both surface sides of the center electrode, two surface electrodes each provided on a surface of the piezoelectric element, the surface not being on a side of the center electrode, the surface electrodes being short circuited to each other, and the surface electrodes being provided with an alternating drive voltage, and a conductive plate disposed to be insulated to each of the two surface electrodes, the conductive plate being grounded.

(11) The imaging apparatus according to any one of (1) to (10), in which the transmission/block section includes a plurality of moving slit plates, the moving slit plates being driven by the actuator to move back and forth, the actuator includes a first actuator and a second actuator, and the first actuator and the second actuator are disposed to obtain an almost orthogonal relationship between a first line segment and a second line segment, the first line segment connecting a pair of slit plate retention sections in the first actuator in charge of driving one of the plurality of moving slit plates, the second line segment connecting a pair of slit plate retention sections in the second actuator in charge of driving another one of the plurality of moving slit plates.

(12) The imaging apparatus according to any one of (1) to (11), in which the imaging optical system, the imaging element section, and the transmission/block section are provided in a chassis, the chassis being made of a conductive material and being grounded.

(13) The imaging apparatus according to (12), in which the conductive material is a conductive resin.

(14) The imaging apparatus according to any one of (1) to (13), in which the imaging optical system, the imaging element section, and the transmission/block section are hermetically sealed in the chassis.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging apparatus, comprising:

an imaging element section configured to include a plurality of pixels;

an imaging optical system configured to form an image on the imaging element section, the image being formed by an electromagnetic wave;

a transmission or block section configured to transmit and block the electromagnetic wave to or against the imaging element section, the transmission or block section being disposed at an aperture stop position in the imaging optical system;

an actuator configured to drive the transmission or block section to move back and forth to be changed in state between a state of transmission and a state of blocking; and an output section configured to produce an image signal output based on a difference between:
  a pixel output from the imaging element section in the state of transmission, and
  a pixel output from the imaging element section in the state of blocking, wherein the difference corresponds to a temperature difference of the imaging element section between the state of transmission and the state of blocking.

2. The imaging apparatus according to claim 1, wherein the transmission or block section is formed to include a plurality of slit plates.

3. The imaging apparatus according to claim 1, wherein the transmission or block section is formed to include a fixed slit plate and a moving slit plate, the moving slit plate being driven by the actuator to move back and forth.

4. The imaging apparatus according to claim 3, wherein the moving slit plate includes a plurality of moving slit plates.

5. The imaging apparatus according to claim 3, wherein the moving slit plate includes a plurality of moving slit plates, the plurality of moving slit plates being driven to move back and forth in opposite directions.

6. The imaging apparatus according to claim 3, wherein the fixed slit plate is configured to serve as an aperture stop in the imaging optical system.

7. The imaging apparatus according to claim 2, wherein the plurality of slit plates in the transmission or block section are all moving slit plates, the moving slit plates being driven by the actuator to move back and forth.

8. The imaging apparatus according to claim 7, further comprising: a plurality of moving slit plates, wherein the plurality of moving slit plates are driven to move back and forth in opposite directions.

9. The imaging apparatus according to claim 1, wherein the actuator is one of a Lorentz force actuator, a polymer actuator, an electromagnet actuator, or a piezo actuator.

10. The imaging apparatus according to claim 1, wherein the actuator is a piezo actuator using a bimorph piezo element, and the bimorph piezo element is formed to include:
   a center electrode connected to the transmission or block section, the center electrode being grounded,
   a piezoelectric element provided on both surface sides of the center electrode,
   two surface electrodes each provided on a surface of the piezoelectric element, the surface not being on a side of the center electrode, the two surface electrodes being short circuited to each other, and the two surface electrodes being provided with an alternating drive voltage, and
   a conductive plate disposed to be insulated to each of the two surface electrodes, the conductive plate being grounded.

11. The imaging apparatus according to claim 1, wherein the transmission or block section includes a plurality of moving slit plates, the moving slit plates being driven by the actuator to move back and forth, the actuator includes a first actuator and a second actuator, and
   the first actuator and the second actuator are disposed to obtain a substantially orthogonal relationship between a first line segment and a second line segment, the first line segment connecting a pair of slit plate retention sections in the first actuator in charge of driving one of the plurality of moving slit plates, the second line segment connecting a pair of slit plate retention sections in the second actuator in charge of driving another of the plurality of moving slit plates.

12. The imaging apparatus according to claim 1, wherein the imaging optical system, the imaging element section, and the transmission or block section are provided in a chassis, the chassis being made of a conductive material and being grounded.

13. The imaging apparatus according to claim 12, wherein the conductive material is a conductive resin.

14. The imaging apparatus according to claim 1, wherein the imaging optical system, the imaging element section, and the transmission or block section are hermetically sealed in a chassis.

15. An imaging method comprising:
   in an imaging apparatus including an imaging element section configured to include a plurality of pixels, and an imaging optical system configured to form an image on the imaging element section by an electromagnetic wave:
   driving a transmission or block section to move back and forth to be changed in state between a state of transmission and a state of blocking, the transmission or block section being disposed at an aperture stop position in the imaging optical system, and the transmission or block section transmitting and blocking the electromagnetic wave to or against the plurality of pixels in the imaging element section; and
   producing an image signal output based on a difference between:
      a pixel output from the imaging element section in the state of transmission, and
      a pixel output from the imaging element section in the state of blocking, wherein the difference corresponds to a temperature difference of the imaging element section between the state of transmission and the state of blocking.

16. The imaging apparatus according to claim 1, wherein the transmission or block section is disposed adjacent to an aperture-stop member of the imaging optical system.

17. The imaging apparatus according to claim 1, wherein a part of the transmission or block section is integrated with an aperture-stop member of the imaging optical system.

* * * * *